(12) United States Patent
Abrahami

(10) Patent No.: US 10,977,427 B2
(45) Date of Patent: Apr. 13, 2021

(54) THIRD PARTY APPLICATION COMMUNICATION API

(71) Applicant: Wix.com Ltd., Tel Aviv (IL)

(72) Inventor: Yoav Abrahami, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

(21) Appl. No.: 16/702,610

(22) Filed: Dec. 4, 2019

(65) Prior Publication Data

US 2020/0104347 A1   Apr. 2, 2020

Related U.S. Application Data

(62) Division of application No. 14/176,166, filed on Feb. 10, 2014, now Pat. No. 10,509,850.

(60) Provisional application No. 61/762,902, filed on Feb. 10, 2013.

(51) Int. Cl.
*G06F 17/00* (2019.01)
*G06F 40/14* (2020.01)
*G06F 16/958* (2019.01)
*H04L 29/08* (2006.01)

(52) U.S. Cl.
CPC ............ *G06F 40/14* (2020.01); *G06F 16/958* (2019.01); *H04L 67/20* (2013.01)

(58) Field of Classification Search
CPC ...... G06F 40/14; G06F 40/186; G06F 16/958; H04L 67/20
See application file for complete search history.

(56) References Cited

U.S. PATENT DOCUMENTS

| 7,281,202 B2 | 10/2007 | Croney et al. |
| 7,533,142 B2 | 5/2009 | Ng et al. |
| 2001/0044825 A1 | 11/2001 | Barritz |
| 2002/0010776 A1 | 1/2002 | Lerner |
| 2002/0129165 A1 | 9/2002 | Dingsor et al. |
| 2004/0268228 A1 | 12/2004 | Croney |

(Continued)

FOREIGN PATENT DOCUMENTS

| JP | 2004220193 A | 8/2004 |
| JP | 2004246509 A | 9/2004 |

(Continued)

OTHER PUBLICATIONS

Supplementary European Search Report for corresponding European application 14 74 9075 dated Sep. 5, 2016.

(Continued)

*Primary Examiner* — Andrew T McIntosh
(74) *Attorney, Agent, or Firm* — Heidi Brun Associates Ltd.

(57) ABSTRACT

A device for a website building system includes a third party application receiver to receive at least one website building system template from an outside source where a third party application is associated with the at least one website building system template; an installer to install the template into a website page when an instance of the at least one third party application is created within the page; and where the receiver preserves referential integrity between the third party application and the website page and between the third party application and the template and performs interface resolution between the third party application and the page.

7 Claims, 17 Drawing Sheets

(56) References Cited

U.S. PATENT DOCUMENTS

| | | | |
|---|---|---|---|
| 2005/0050454 | A1 | 3/2005 | Jennery |
| 2006/0206391 | A1 | 9/2006 | Delson et al. |
| 2006/0248480 | A1* | 11/2006 | Faraday ................ G06F 40/186 715/866 |
| 2007/0113237 | A1 | 5/2007 | Hickson |
| 2007/0150610 | A1 | 6/2007 | Vassilev et al. |
| 2008/0172608 | A1 | 7/2008 | Patrawala et al. |
| 2008/0195483 | A1 | 8/2008 | Moore |
| 2008/0263566 | A1 | 10/2008 | Buerge et al. |
| 2009/0254392 | A1 | 10/2009 | Zander |
| 2010/0094728 | A1 | 4/2010 | Denning et al. |
| 2010/0241664 | A1 | 9/2010 | Levasseur et al. |
| 2010/0281107 | A1 | 11/2010 | Fallows et al. |
| 2011/0055685 | A1 | 3/2011 | Jaquish et al. |
| 2011/0239134 | A1 | 9/2011 | Spataro et al. |
| 2012/0030592 | A1* | 2/2012 | Cui ...................... G06Q 10/067 715/763 |
| 2012/0198002 | A1 | 8/2012 | Goulart et al. |
| 2012/0290656 | A1 | 11/2012 | Jellard |
| 2013/0217416 | A1 | 8/2013 | Matthews, III |
| 2013/0219263 | A1 | 8/2013 | Abrahami |
| 2013/0347070 | A1* | 12/2013 | Cairns ................... H04L 63/126 726/3 |
| 2014/0047351 | A1 | 2/2014 | Cui |

FOREIGN PATENT DOCUMENTS

| | | |
|---|---|---|
| JP | 2005011355 | 1/2005 |
| WO | 2008111050 A2 | 9/2008 |
| WO | 2008148111 A1 | 12/2008 |
| WO | 2009029404 A2 | 3/2009 |

OTHER PUBLICATIONS

International Search Report for corresponding PCT application PCT/IB2014/058882 dated Jun. 11, 2014.

Supplementary European Search Report for corresponding European application 19 15 5060 dated Apr. 18, 2019.

"EasyXDM—Cross-domain messaging made easy" [online], [retrieved on Feb. 10, 2014] Retrieved from the Internet: <URL:http://easyxdm.net/wp/.

Hickson, Ian,. "WebStorage", W3C Editor's Draft [online], Google Inc. Jan. 17, 2014. [retrieved on Feb. 10, 2014] Retrieved from the Internet: <URL:http://dev.w3.org/html5/webstorage.

Urhane, Eric,. "File API: Directories and System", W3C Editor's Draft, Mar. 7, 2012 [online], Google Inc. [retrieved on Feb. 10, 2014] Retrieved from the Internet: <URL:http://dev.w3.org/2009/dap/file-system/file-dir-sys.html.

Urhane, Eric,. "File API: Writer", W3C Editor's Draft, Mar. 7, 2012 [online], Google Inc. [retrieved on Feb. 10, 2014] Retrieved from the Internet: <URL:http://dev.w3.org/2009/dap/file-system/file-writer.html.

"File API: The FlleReader Interface" [online] [retrieved on Feb. 10, 2014] Retrieved from the Internet: <URL:http://www.w3.org/TR/FileAPI/#dfn-filereader.

Zackas, Nicholas A.,. "Learning from XAuth: Cross-domain localStorage" [online], NCZOnline, Sep. 10, 2010, [retrieved on Feb. 10, 2014] Retrieved from the Internet: <URL:http://www.nczonline.net/blog/2010/09/07/learning-fromxauth-cross-domain-localstorage.

English Abstract of JP 2004220193A downloaded from Google Patents on Aug. 6, 2020.

English Abstract of JP 2004246509A downloaded from Google Patents on Aug. 6, 2020.

* cited by examiner

THIRD PARTY APPLICATION COMMUNICATION API

CROSS REFERENCE TO RELATED APPLICATIONS

This application is a divisional application of U.S. patent application Ser. No. 14/176,166, filed 10 Feb. 2014, which claims priority from U.S. provisional patent application 61/762,902 filed 10 Feb. 2013, both of which are incorporated herein by reference.

FIELD OF THE INVENTION

The present invention relates to on-line applications and their use with contained third party applications in particular.

BACKGROUND OF THE INVENTION

There are many commercially available website building systems and other interactive application building tools that can be used to create and edit websites and other on-line applications. End users can access such websites using client software on a variety of different platforms such as regular personal computers, smart-phones, tablets and other desktop or mobile devices.

These website building systems can come in different configurations such as fully on-line website building systems which are hosted on a server or servers connected to the internet and which are accessed using internet communication protocols such as hypertext transfer protocol (HTTP). The creation, editing and deployment of these website building systems are all performed on-line working directly with the servers.

Website building systems can also be partially online or sometimes even fully offline. For a partially online system, the website editing is performed locally on the user's machine and is later uploaded to a central server or servers for deployment. Once uploaded, these website building systems behave in the same way as the full on-line website building systems.

Website building systems have internal data architecture in order to organize data and elements within the system. This architecture may be different from the external view of the site in question as seen by the user and may also differ from the way typical hypertext markup language (HTML) pages are sent to the browser. For example, the internal data architecture can contain additional properties for each element on the page (creator, creation time, access permissions, links to templates etc.) which are essential for editing and maintaining the site within the website building system, but are not externally visible to the end-user (or even to some editing users). A typical architecture for a website building system based site may consist of pages containing components (e.g. shape components, picture components, text components, single- and multi-page containers containing mini-pages, etc.)

Components may be content-less such as a star-shape which does not have any internal content (through it has color, size, position and some other attributes) or may have internal content, such as a text paragraph component, whose internal content includes the displayed text, as well as font, formatting and layout information. This content may, of course, vary from one instance of the text paragraph component to another.

A designer using such a website building system may design a new creation from scratch (starting with a blank screen), or may rely on predefined application templates created by the designer himself or herself, by the system creator, or by the designer community. The website building system may support templates which are mere component collections, complete pages (or mini pages) or even sets of pages and complete web sites.

When an application template is provided, the designer can customize it at will—adding, removing or modifying all elements of the template to create his or her version of the template. Such customization may be implemented by creating a modified version of the template (which is distinct and separate from the template). Alternatively, the website building system may apply the customizations through an inheritance-type mechanism which retains the link to the original template, and would thus reflect later changes made to the template.

Website building systems can also be extended using third party applications and components embedded in them. Such third party applications may be included in the website building system design environment or may be purchased (or otherwise acquired) separately through a number of distribution mechanisms, such as from an application store (AppStore) integrated into the website building system, or from a separate, web-based or standalone application repository (or AppStore) operated by the website building systems (WBS) vendor or by another entity. Third party applications may be also be obtained directly from the third party application vendor (through an AppStore or not)—which would provide an actual installation module, or just an activation or access code.

A third party application may include any combination of front-end (display) elements with back-office elements (which are not a part of the visual web site display). The third party application may be entirely back-office (i.e. include no display element), entirely front-end (i.e. be activated only within the context of web site use) or be a combination of the two.

The back-office element of the third party application may include functions such as data-base communication, external update options etc. For example, a blog third party application might include a back-office element which allow updates to be received from non-human sources (e.g. a RSS news feed from a major news service), as well as from human sources not related to the web site (e.g. a stand-alone smart-phone application which allows submission of blog entries).

The integration of the visual element of a third party application into the containing web site can be done in a number of ways. Widget-type third party applications can be embedded inside a web site page as a component whereas section-type third party applications can be added to the web site as an additional page or pages.

Furthermore third party applications (both widget and section) can be single-page third party applications or multi-page third party applications (which have internal mini-pages represented as an internal URL structure). A system may implement any or all of the four possible combinations (widget or section, single-page or multi-page).

Multi-page third party applications usually provide a default "landing" mini-page, which could be an opening page, a specific internal mini-page (e.g. the most recent blog entry in a blog third party application), a mini-page selection screen or some other mini-page.

The use of third party applications in website building system-based web sites is done through third party application instances. The website building system may support multiple uses of third party applications at a number of levels, such as allowing a single third party application instance in the entire web site; allowing instances of multiple third party applications to be created inside the web site (but not more than one instance of any given third party application) and allowing multiple instances of multiple third party applications to be created, but no more than one instance per a given page. It may also allow multiple instances per page of component third party applications but not of section third party applications and may also allow multiple instances of multiple third party applications to be created without any limitations on the amount, multiplicity or location of the third party applications instances.

The third party application instance may have instance-specific content. For example, an e-Shop third party application may have a product database associated with the specific instance, which is different from the product database associated with other instances of the same e-Shop third party application (in the same site or other sites).

For the purposes of discussion, the web site page (or mini-page) containing the third party application and its mini-pages or elements (i.e. the "wrapper page") shall be known as the containing web page and to the entire web site as the main page. The integrated page shown to the user—including the main page and an embedded TPA mini-page/component—shall be referred to as combined page. For section type third party applications, the "virtual page" containing the third party application would serve as the containing web page.

Third party applications are usually deployed either on the website building system vendor servers, on the third party application vendor server, on external ($4^{th}$ party) servers, or any combination thereof. A third party application may also include elements actually running on the end user machine, such as a statically-installed browser extension or a dynamically run JavaScript component running inside the website building system client-side code as is illustrated in FIG. 1 to which reference is now made.

The website building system vendor's servers act as a contact point for the end-user, and responds to requests (possibly connecting to the third party applications vendors' servers to receive required information). The website building system may create direct connections (as required) between the client computer and the third party application vendors' servers, for example when video streaming is required.

Included third party application instances may have their own internal content, similar to the way in which regular components include internal content. The third party application may manage this content independently of the website building system and of the website generated using the website building system as is illustrated in FIG. 2 to which reference is now made. Multiple third party application instances (of single or multiple third party applications) may have shared content, e.g. two e-Shop instances in two separate web site pages may refer to the same product database.

The output from included third party applications may be integrated into the containing web page in a number of ways, such as:

Server Side Processing: in this alternative as is illustrated in FIG. 3 to which reference is now made, third party application [a] (including design and display elements) and the user-specific third party application data [b] are merged by the third party application server code [c] running on the third party application vendors' server [d]. They are sent over the communication medium [e] to the website building system server code [f] which merges them with the containing web page information [g] and then sends them for display on the user client station [h].

Client-Side Processing: in this alternative as is illustrated in FIG. 4 to which reference is now made, third party application [a] (including design and display elements) and the user-specific third party application data [b] are merged by the third party application server code [c] running on the third party application vendors' server [d]. They are sent over the communication medium [e] to a client side processing component [h]. The website building system server code [f] sends the containing web page information [g] to this client side processing component [h]. The client side processing component [h] performs the merging of the two source of information and presents a unified application to the browser (or other client agent) [i].

iFrame Inclusion: in this alternative as is illustrated in FIG. 5 to which reference is now made, the third party application [a] (including design and display elements) and the user-specific third party application data [b] are merged by the third party application server code [c] running on the third party application vendors' server [d]. They are sent over the communication medium [e] to a browser-based application [h] running inside the user agent (e.g. a web browser) [i]. The website building system server code [f] sends the containing web page information [g] to this browser-based application [h]. The containing web page is realized as a web page which contains one or more iframe directives which include the content from the third party application server [d]. Additional and alternative methods may be applicable as well.

SUMMARY OF THE PRESENT INVENTION

There is provided in accordance with a preferred embodiment of the present invention, a device for a website building system. The device includes a page composer to create a page containing web site instances of at least one third party application and a configurer to define a 2-way communication backchannel between the page and the at least one third party application or between the at least one third party application and at least one other third party application. The device also includes a coordinator to coordinate communication according to the communication backchannel when the page is viewed or accessed.

Moreover, in accordance with a preferred embodiment of the present invention, the device is implementable on a client.

Further, in accordance with a preferred embodiment of the present invention, the device is implementable on a server.

Still further, in accordance with a preferred embodiment of the present invention, the communication backchannel is at least one of an HTML5 (Hypertext Markup Language 5) a PostMessage, a URL fragment identifier for messages, a specialized communication web service, an HTML5 local storage, an HTML5 local file system access APIs and a specialized browser plug in.

Additionally, in accordance with a preferred embodiment of the present invention, the coordinator is embedded in the page using an iframe.

Moreover, in accordance with a preferred embodiment of the present invention, the at least one third party application is embedded in the page using an iframe.

Further, in accordance with a preferred embodiment of the present invention, the at least one third party application is at least one of a multi-part third party application and a modular third party application.

Still further, in accordance with a preferred embodiment of the present invention, the coordinator includes a configuration manager to monitor pre-defined at least one third party application instances.

Additionally, in accordance with a preferred embodiment of the present invention, the coordinator includes a smart identifier and addresser to identify and translate symbolic and absolute addresses of the source or target of the communication.

Moreover, in accordance with a preferred embodiment of the present invention, the coordinator includes a communication policy enforcer to enforce a communication policy between the website building system and the at least one third party application.

Further, in accordance with a preferred embodiment of the present invention, the coordinator includes a redirector to reroute communication messages to and from the at least one third party application within the website building system.

Still further, in accordance with a preferred embodiment of the present invention, the coordinator includes an originator verifier to verify authenticity of incoming messages from the at least one third party application.

Additionally, in accordance with a preferred embodiment of the present invention, the coordinator includes a protocol translator to resolve protocol compatibility issues between the website building system and the at least one third party application and between the third party application and the at least one other third party application.

Moreover, in accordance with a preferred embodiment of the present invention, the coordinator includes a dynamic layout updater to update dynamic layout changes between at least one of the page and the at least one third party application, the at least one third party application and the page and the at least one third party application and the at least one other third party application.

Further, in accordance with a preferred embodiment of the present invention, the coordinator includes an updater to update at least one of a global attribute of the website building system, a control permission of the at least one third party application and the layout, style and content of elements of the page.

There is provided in accordance with a preferred embodiment of the present invention, a device for a website building system, the device includes a third party application receiver to receive at least one website building system template from an outside source where a third party application is associated with the at least one website building system template. The device also includes an installer to install the template into a website page when an instance of the at least one third party application is created within the page.

Moreover, in accordance with a preferred embodiment of the present invention, the device is implementable on at least one of a server and client.

Further, in accordance with a preferred embodiment of the present invention, the template is editable.

Still further, in accordance with a preferred embodiment of the present invention, the template contains at least one of a website building system component and a multipart third party application.

Additionally, in accordance with a preferred embodiment of the present invention, the website page is at least one of an existing page, an existing mini-page, a newly created page and a newly created mini-page.

Moreover, in accordance with a preferred embodiment of the present invention, the receiver preserves referential integrity and performs interface resolution between the at least one third party application and the page.

There is provided in accordance with a preferred embodiment of the present invention, a method for a website building system. The method includes creating a page containing website instances of at least one third party application and defining a 2-way communication backchannel between the page and the at least one third party application or between the at least one third party application and at least one other third party application. The method also includes coordinating communication according to the communication backchannel when the page is viewed or accessed.

Moreover, in accordance with a preferred embodiment of the present invention, the at least one third party application is at least one of a multi-party third party application and a modular third party application.

Further, in accordance with a preferred embodiment of the present invention, the coordinating includes monitoring pre-defined at least one third party application instances.

Still further, in accordance with a preferred embodiment of the present invention, the coordinating comprises identifying and translating symbolic and absolute addresses of the source or target of the communication.

Additionally, in accordance with a preferred embodiment of the present invention, the coordinating includes enforcing a communication policy between the website building system and the at least one third party application.

Moreover, in accordance with a preferred embodiment of the present invention, the coordinating includes rerouting communication messages to and from the at least one third party application within the website building system.

Further, in accordance with a preferred embodiment of the present invention, the coordinating includes verifying the authenticity of incoming messages from the at least one third party application.

Still further, in accordance with a preferred embodiment of the present invention, the coordinating includes resolving protocol compatibility issues between the website building system and the at least one third party application and between the third party application and the at least one other third party application.

Additionally, in accordance with a preferred embodiment of the present invention, the coordinating includes dynamic layout updating of changes between at least one of the page and the at least one third party application, the at least one third party application and the page, and the at least one third party application and the at least one other third party application.

Moreover, in accordance with a preferred embodiment of the present invention, the coordinating includes updating at least one of a global attribute of the website building system, a control permission of the at least one third party application and the layout, style and content of elements of the page.

Further, in accordance with a preferred embodiment of the present invention, the updating includes cascading style sheets.

There is provided in accordance with a preferred embodiment of the present invention, a method for a website building system. The method includes receiving at least one website building system template from an outside source where the third party application is associated with the at least one website building system template. The method also includes installing the template into a website page when an instance of the at least one third party application is created within the page.

Moreover, in accordance with a preferred embodiment of the present invention, the template is editable.

Further, in accordance with a preferred embodiment of the present invention, the template contains at least one of a website building system component and a multipart third party application.

Still further, in accordance with a preferred embodiment of the present invention, the website page is at least one of an existing page, an existing mini-page, a newly created page and a newly created mini-page.

Additionally, in accordance with a preferred embodiment of the present invention, the receiving preserves referential integrity and performs interface resolution between the at least one third party application and the page.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
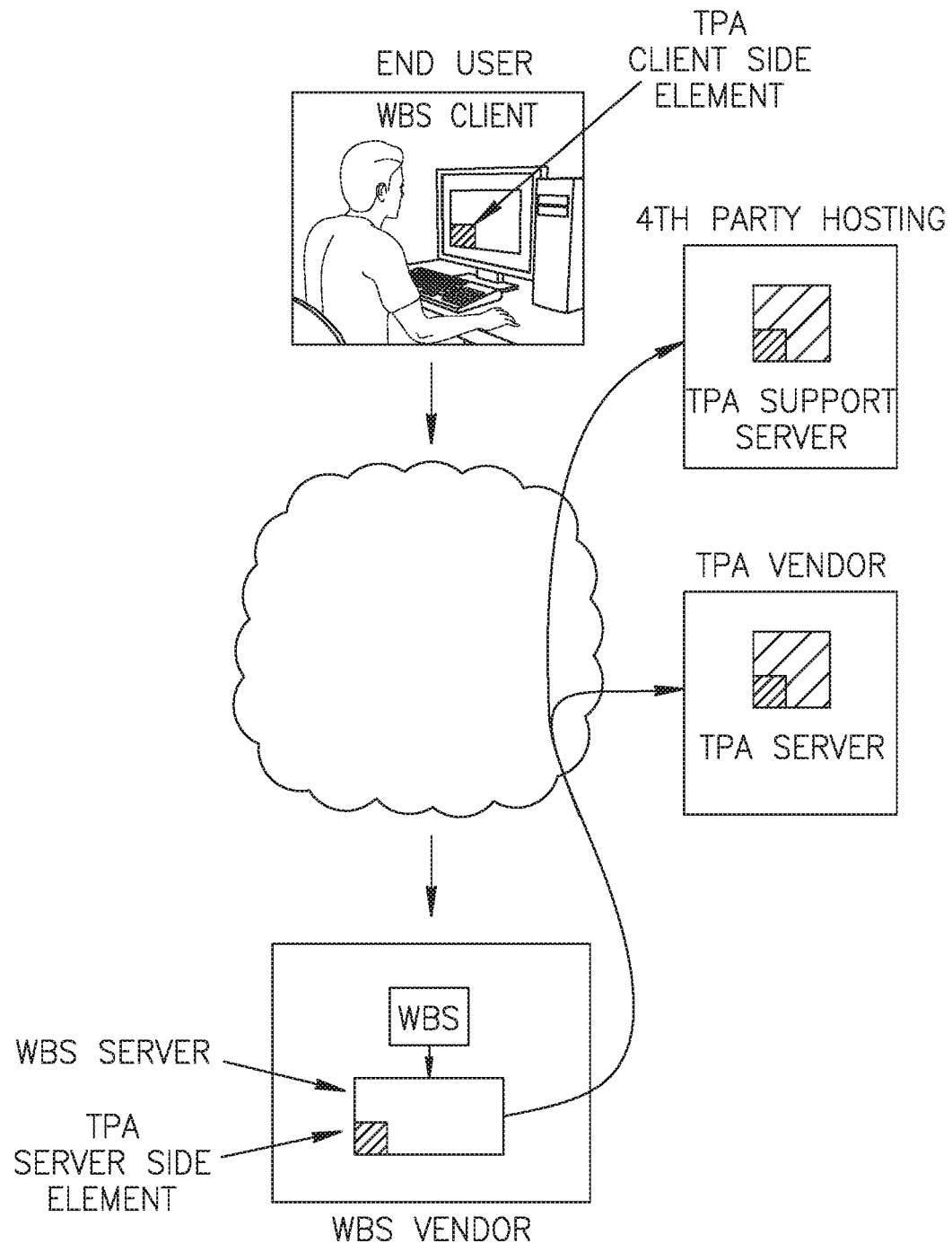
FIG. 1 is a schematic illustration of deployment configurations between a website building system and a third party application.
Figure 2:
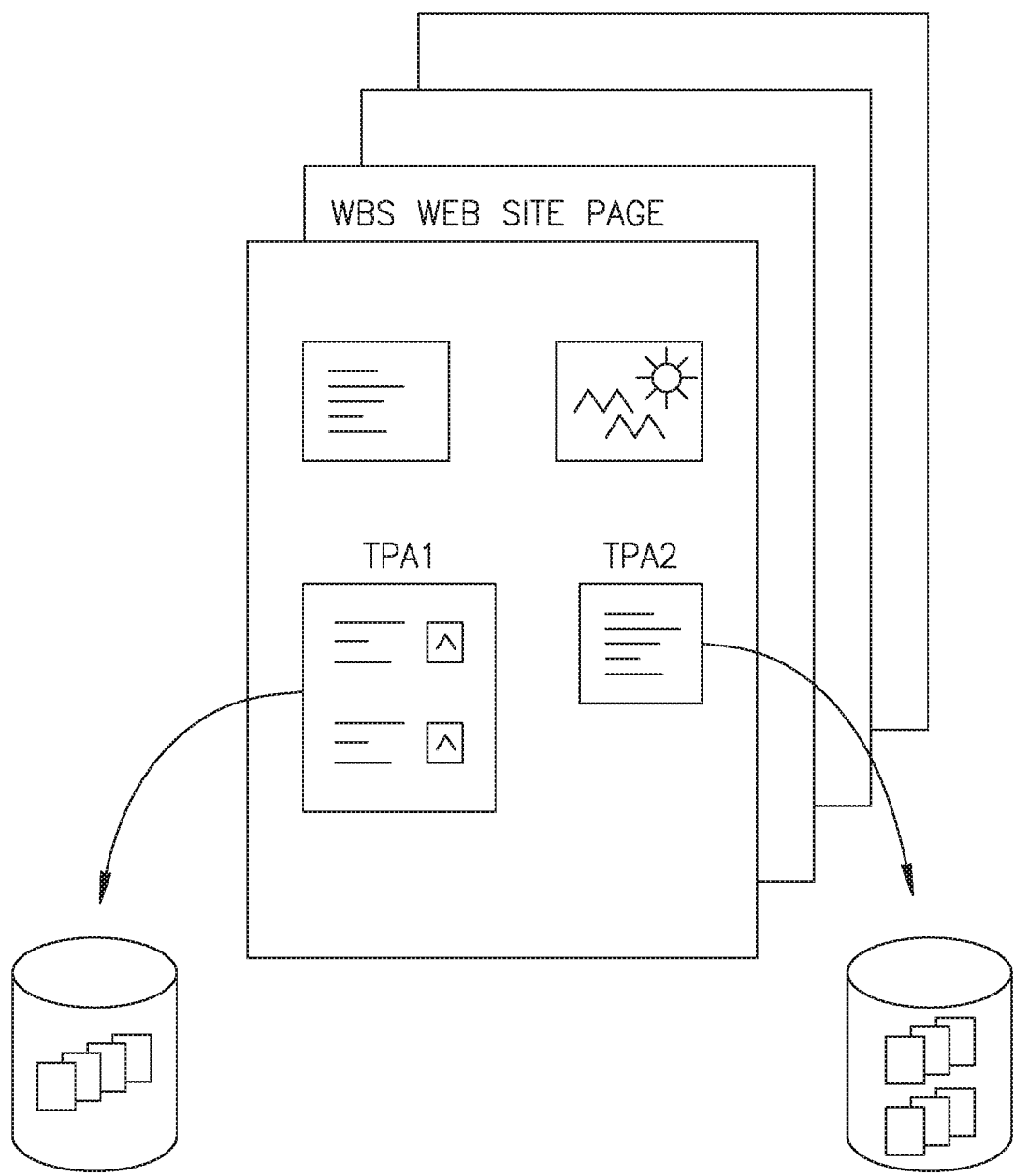
FIG. 2 is a schematic illustration of third party application internal content management.
Figure 3:
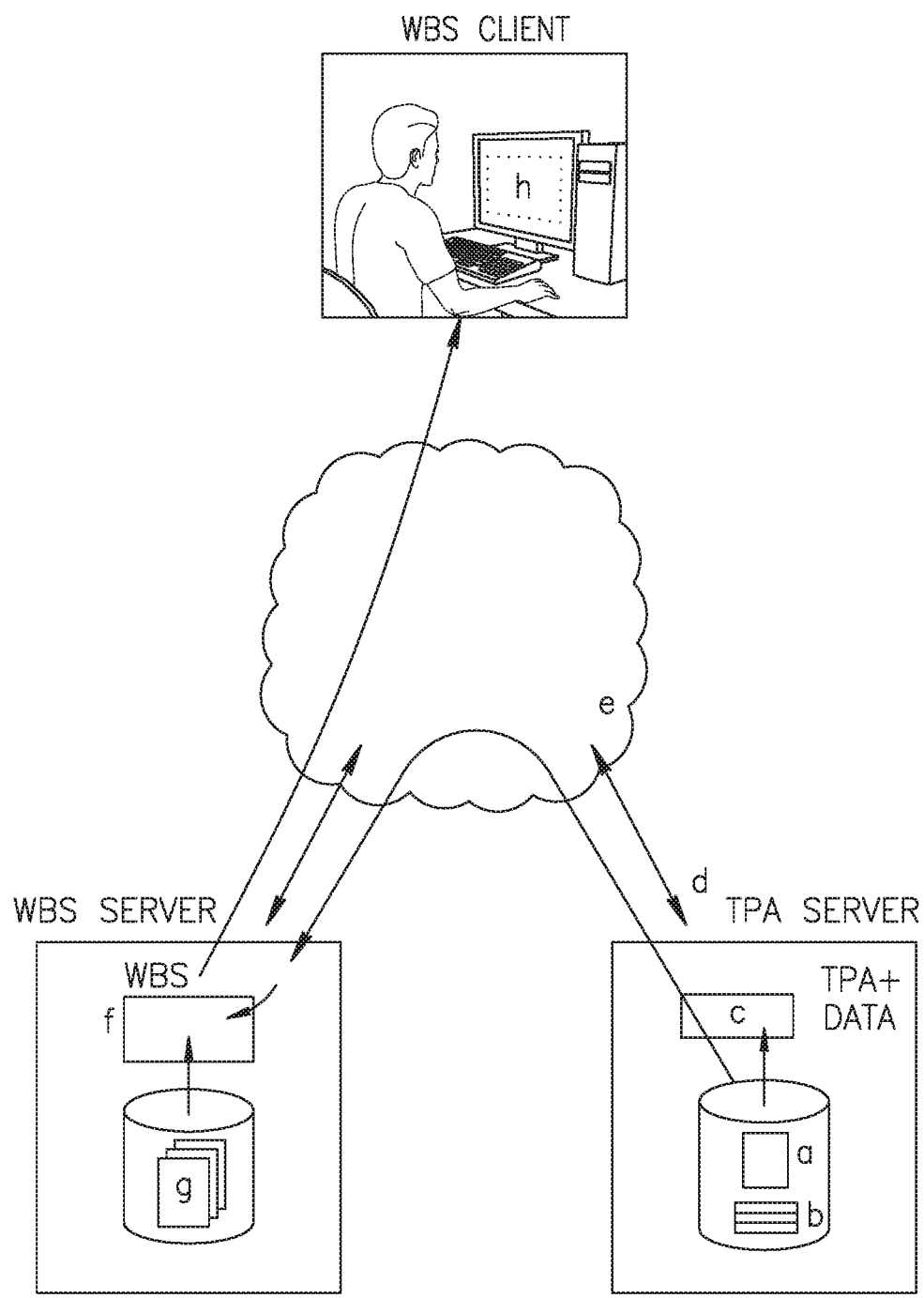
FIG. 3 is a schematic illustration of third party application inclusion in a containing web page through server side processing.
Figure 4:
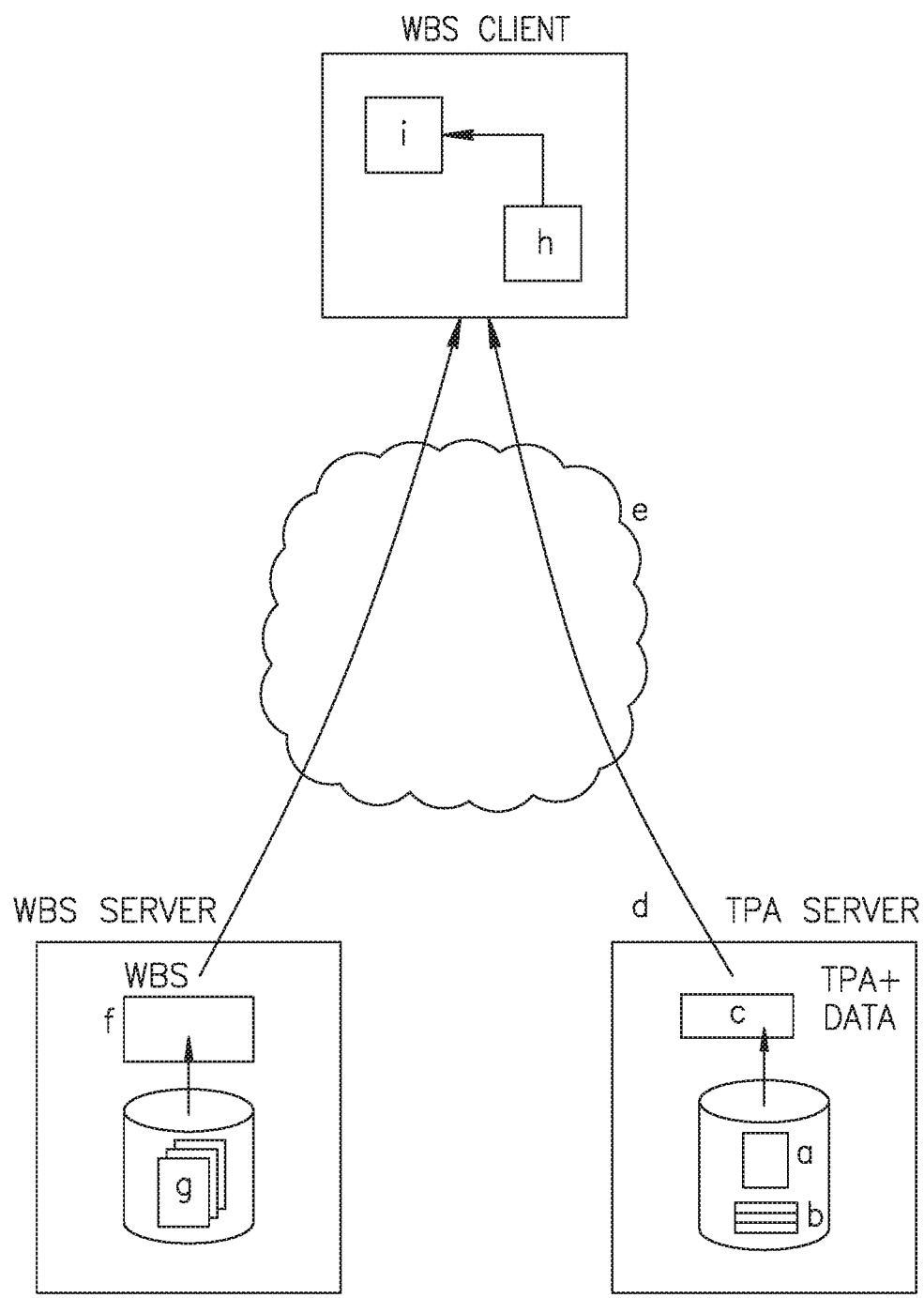
FIG. 4 is a schematic illustration of third party application inclusion in a containing web page through client side processing.
Figure 5:
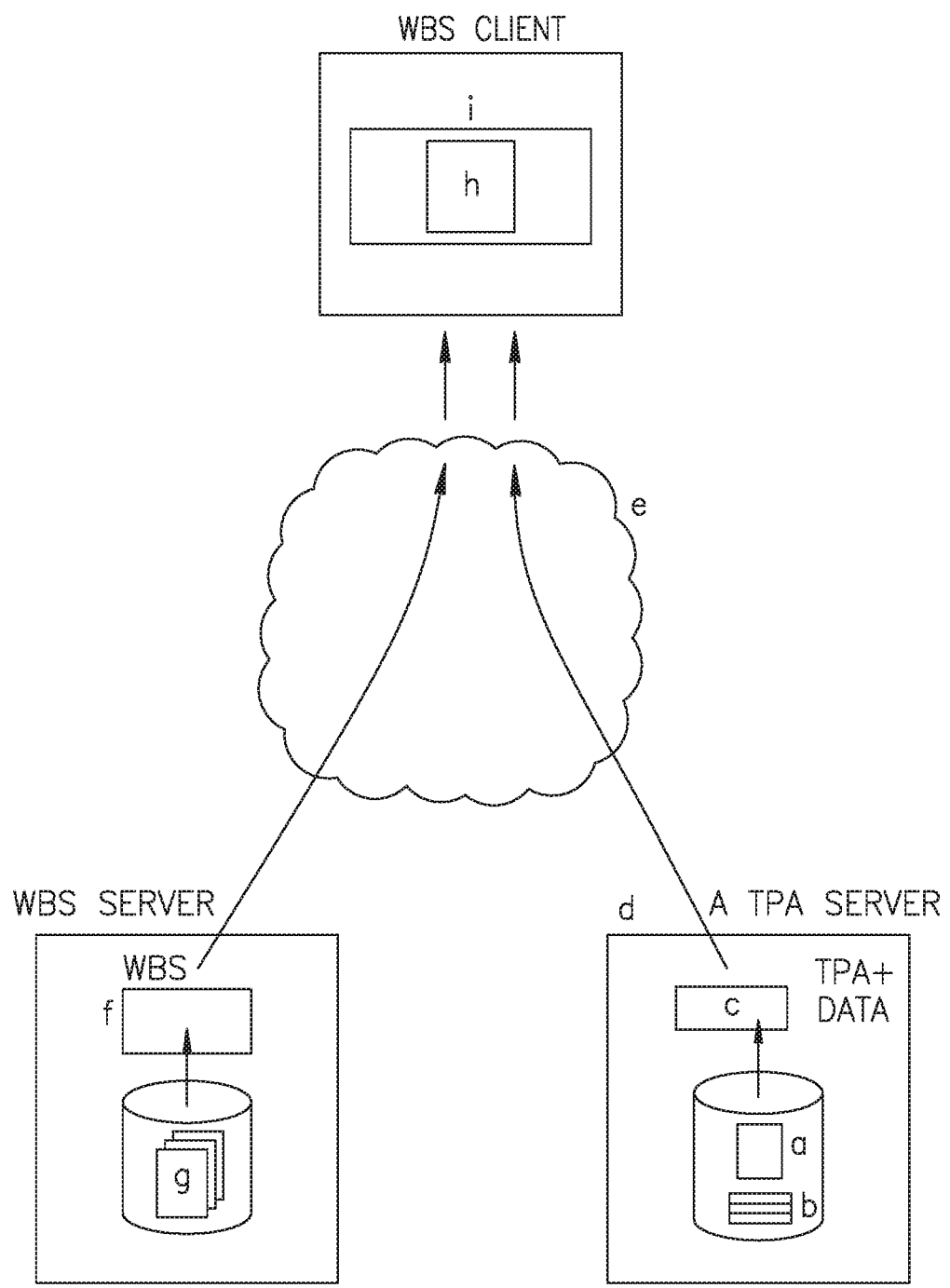
FIG. 5 is a schematic illustration of third party application inclusion in a containing web page through iframe inclusion.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that are numerous limitations of current methods in the way third party applications are typically integrated into website building systems and in the way in which integrated third party applications and website building systems interact.

These limitations include the third party application display being limited to a single rectangular area inside the containing web page, the area contained in the iframe. They also include the ability of the third party application to control its own windows' size and position, as well visual elements which are outside the actual the third party application display window (e.g. specialized display frames around the third party application window).

The third party application may have its own display styles (color schemes, fonts, character sizes, etc.). These styles may be good for some containing web pages but may be visually problematic or discordant with other containing web pages.

Figure 6:
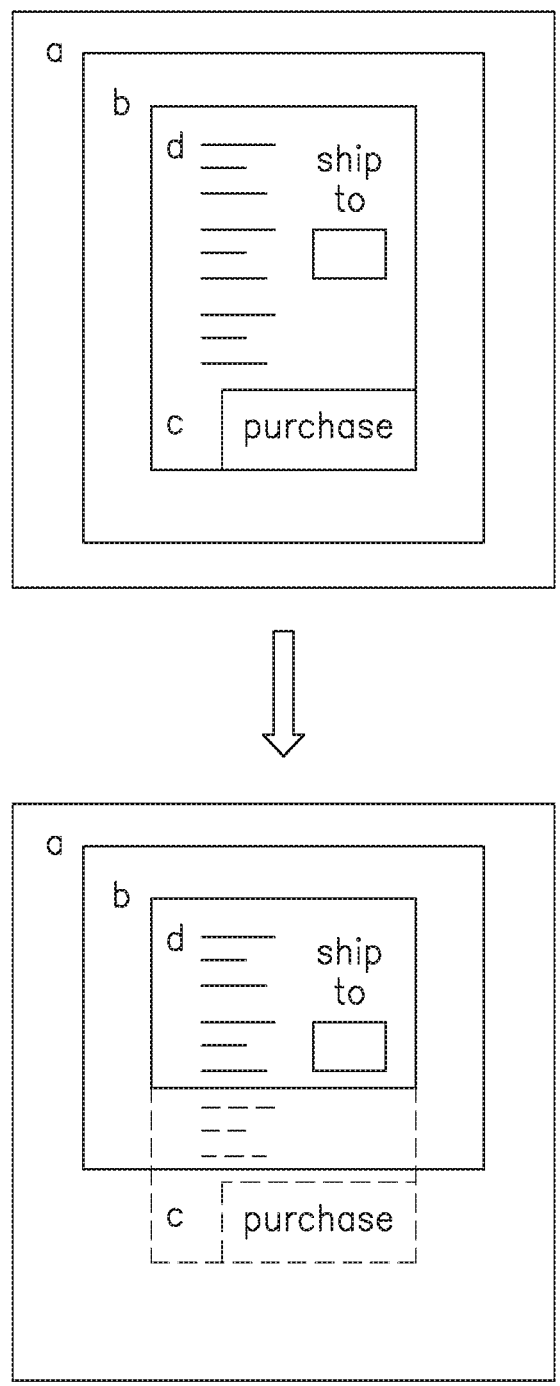
FIG. 6 is a schematic illustration of existing and non-optimal third party application displays during page layout change.

Another limitation is the rigidity of the third party application display from the view point of the containing site. If the site has to be visually modified (e.g. due to deployment to a platform with different screen size or due to dynamic layout event), the containing web page may be required to change the size of the window allocated to the third party application. In such a case, the third party application display would be clipped and would require scrolling via scroll bars to reach different sub-areas in the third party application. Reference is now made to FIG. 6 which illustrates an example of what may happen when containing web page [a] is resized, the area allocated to the e-Shop third party application [b] is reduced, and the "Purchase" button [c] can't be viewed together with the content of the shopping cart [d]—requiring multiple scrolling actions to complete a purchase, and making is vastly less likely that a purchase would in fact be completed.

It will be appreciated that a third party application cannot interact with other components in the containing webpage and that such an interaction is sometimes required to achieve complex functionality. In particular, there is no way for the third party application to perform differently according to the type and content of the components in the containing web page. An example of this may be a website that streams an online cookery course. The user may wish to have in the background to watching his movie, a small area of his screen dedicated to a feed with news and weather updates in another area of his screen (such as a live stream from CNN). He may wish to automatically pause his learning session when the weather report for his residential area begins.

There is also no clear, standard way for multiple third party applications to cooperate with each other, in particular if they are provided by different vendors. Thus, a designer has no clear way to combine multiple third party applications from different vendors. An example of this may be for an ecommerce website running a module from a third party ordering system and a different module for a shipping system. It may be desirable to order supplies according to the shipping schedule etc.

Applicants have realized that this integration may be achieved by using structured two-way communication channels between the website building system and the third party application instances included in it and between the different third party application instances that may be implemented within the same containing page. These channels may also transfer information concerning layout, style and additional information.

It will be appreciated that the discussion below focuses on the iframe inclusion method, which is the preferred method as it is built into and integrated with modern browsers, and does not require the creation of special integration code. Iframe inclusion also provides browser-supported encapsulation and sandboxing as well as inherent protection against hacking techniques such as cross-site scripting attacks which may be employed by malicious third party applications.

Figure 7A:
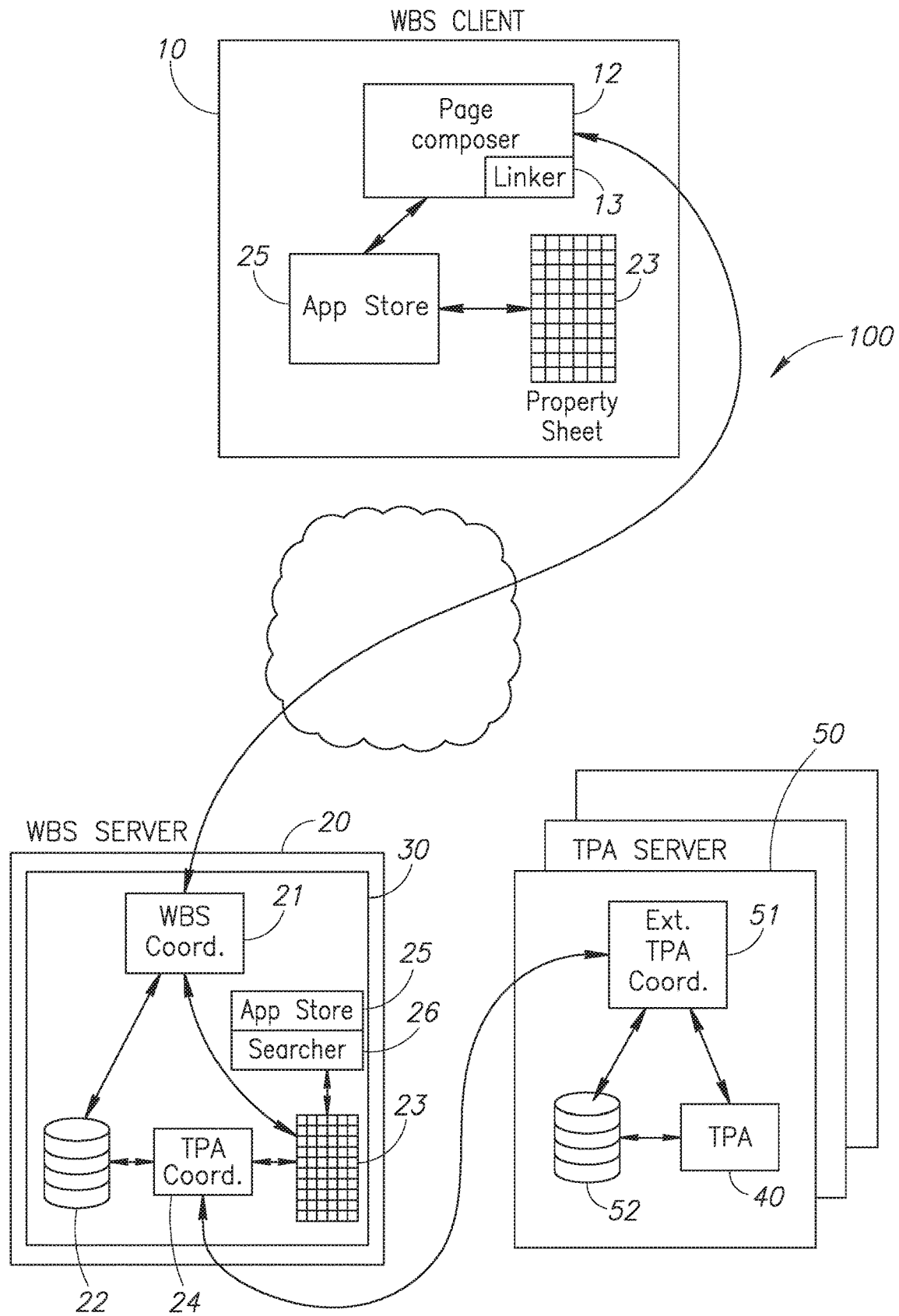
FIGS. 7A and 7B are schematic illustrations of a system for integrating a website building system and one or more third party applications, constructed and operative in accordance with the present invention.
Figure 7B:
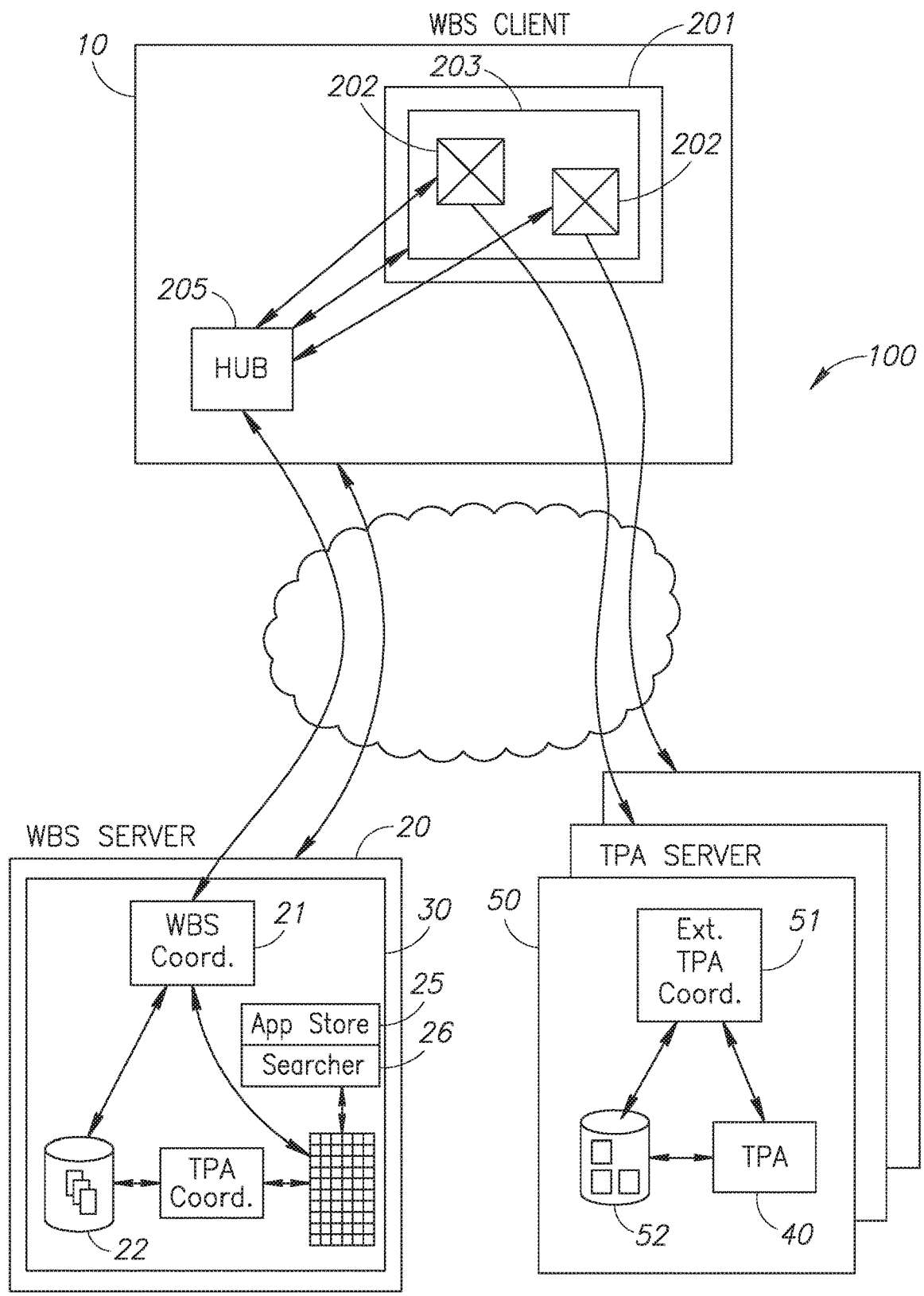

Reference is now made to FIGS. 7A and 7B which illustrate a system 100 for integrating a website building system and one or more third party applications, according to an embodiment of the present invention. FIG. 7A illustrates system 100 at the design stage and FIG. 7B illustrates system 100 at runtime. As can be seen in FIG. 7A, system 100 comprises a client 10, a website building system 30 installed on a website building system (WBS) server 20 and one or more third party applications 40 installed on one or more third party application servers 50. Website building system 30 comprises a WBS coordinator 21, application repository 22, WBS side TPA property sheet 23, third party application (TPA) coordinator 24 and AppStore 25 (which may contain a searcher 26). Client 10 comprises page composer 12 and a client side view of TPA property sheet 23. In some embodiments client 10 may also comprise a client side view of AppStore 25. Page composer 12 comprises a linker 13 described in more detail herein below. Third party server 50 comprises third party application 40, external TPA coordinator 51 and TPA database 52 storing third party application 40 components, templates etc. for use. Note that the system 100 may include multiple third party servers 50 belonging to multiple third party application 40 vendors.

It will be appreciated that TPA property sheet 23 may be invoked when attributes are specified for a given third party application 40 instance. It will be further appreciated that when invoked, TPA property sheet 23 may appear as a client side view of TPA property sheet 23 on client 10. It will also be further appreciated that an off-line embodiment may have its property sheet as part of the installed client software, therefore there would be no TPA property sheet 23 or repository thereof.

It will be appreciated that a designer or end-user 5 sitting at client 10, may create his website (or any other online application) using page composer 12 to create website pages and interactions (inter-page as well as intra-page). Designer 5 may select components, templates etc. that are part of website building system 30 stored in application repository 22 via WBS coordinator 21. Designer 5 may also create a containing web page 203 which embeds third party application 40 instances from third party applications 40 which may have been pre-bought and whose templates, components etc. may be stored on application repository 22. In an alternative embodiment, the purchased templates, components etc. may be stored on TPA database 52 and accessed via external TPA coordinator 51. It yet another embodiment, third party application 40 templates, components etc. may be bought purchased according to need via AppStore 25. Property sheet 23 may be specified by designer 5 and hold information regarding the third party application 40 instances that have been purchased such as permissions, installation instructions, payment etc. as described in more detail herein below. Designer 5 may also use linker 13 to manually designate any communication channels (if required) between the contained third party applications 40. It will also be appreciated that linker 13 may also allow designer 5 to specify any specific communication connection and rules between the containing webpage being built and the third party application 40 instances that are being contained such as the movie and the CNN news report being shown simultaneously as described herein above. It will be appreciated that the linkage created by linker 13 may be modified through the web site lifetime.

It will be appreciated that designer 5 may acquire a third party application 40 through channels external to AppStore 25 such as an external AppStore operated by the third party application 40 vendor or an external party. In such a case, website building system 30 may register the third party application 40 and its configuration data the first time the third party application 40 is installed in a web site created by designer 5 through website building system 30.

It will be appreciated that in order for linker 13 to provide the ability to setup potential communication channels, third party application 40 needs to be able to properly recognize and identify components in containing web page 203 (with which it would like to communicate)—including other third party application 40 instances. For components based on an associated template (described in more detail herein below), the identification is performed in advance by the third party application 40 vendor. Components in the associated template may be given specific reference ID's, and these ID's may be used by third party application 40 when communicating with them.

It will be further appreciated that for multi-part third party applications 40 (described in more detail herein below), i.e. a single third party application 40 spread over multiple iframes, the multiple parts may automatically know how to communicate with each other.

For containing web site page components not included in an associated template (as described in more detail herein below), third party application 40 may include a list of required (mandatory and optional) containing web page 203 components which should exist so it may function. The list may be stored within property sheet 23 and include unique ID's, description and component details (e.g. must be a text component, would be used as blog talkback label). The list may be detailed in the third party application 40 entry into AppStore 25, and designer 5 may use linker 13 to specify components (fields) in containing web page 203 conforming to the third party application 40 requirements. It will be appreciated that website building system 30 may dynamically create missing containing web page 203 components when the third party application 40 instance is created, and may allow designer 5 to move, resize and fully specify them later.

Alternatively, website building system 30 may expose a full or partial component model of containing web page 203 to the third party applications 40 included in containing web page 203. It will be appreciated that this may be a component model and not the Document Object Model (DOM) of containing web page 203. The containing web page 203 DOM may be far more complicated and detailed than the component model, since the actual containing web page 203 may contain numerous HTML elements—both hidden and visible—which are part of the website building system 30 infrastructure or which support containing web page 203 components. The component model would thus be much simpler.

Figure 8:
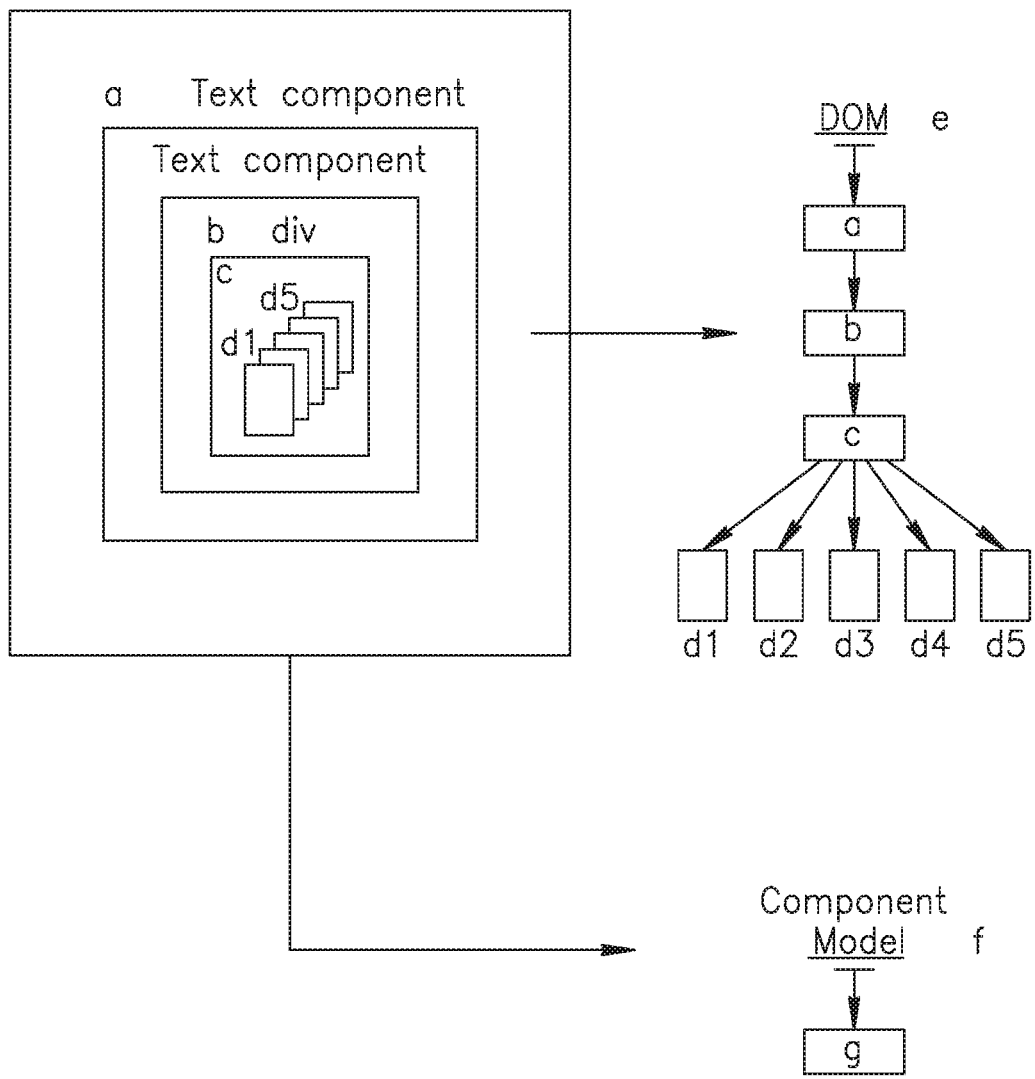
FIG. 8 is a schematic illustration of a document object model compared to a component model.

Reference is now made to FIG. 8 which illustrates how a text component [a] may be implemented using a number of HTML constructs (such as the enclosing div tag [b], internal div tag [c], frame "mini widgets" [d1] . . . [d5] etc.). The DOM model [e] for containing web page 203 may contain separate DOM tree nodes for each of these sub-elements. The component model [f] may be much simpler, containing just a single component node [g].

It will be appreciated that system 100 may also support selective component exposure—designer 5 may designate via linker 13 which components should be exposed to third party application 40, and only these components (possibly including the "containment path" leading to them) may be included in the simplified component model visible to third party application 40. The specification may be performed by explicitly marking the included components, according to their type or any other website building system 30 attribute. Third party application 40 may then traverse the containing web page 203 component model and locate the required components.

It will also be appreciated that links between containing web page 203 and third party application 40 instances may also be created automatically such as broadcast linking in which third party application 40 may send a communication during runtime to record a particular event. This communication maybe optional or mandatory (i.e. the third party application 40 may not function or install unless there is a matching third party application 40 that has been linked to receive such messages. For example, third party application 40 may broadcast information packets about the activities it performs, and any installed logging third party applications 40 may receive these information packets.

The newly created pages which are now complete with settings may be stored in application repository 22 (via WBS coordinator 21) to be called at run-time as described in more detail herein below.

Reference is now made back to FIG. 7B. In this embodiment the elements are the same as those in FIG. 7A except for the elements of client 10. During runtime, client 10 comprises viewer 201 to display containing web pages 203. It will be appreciated that viewer 201 may comprise multiple view ports 202, each to display a different instance of third party application 40 (the instances derived from one or more third party application 40). Client 10 also comprises communication hub 205 to promote communication and to provide a back channel between containing web page 203 and any third party applications 40 it is hosting together with any communication that is required between the hosted third party applications 40 without any connection to the pertinent containing web page 203. The functionality of hub 205 will be described in more detail herein below.

It will be appreciated that hub 205 may be implemented on client 10 since containing web page 203 and any third party application 40 inclusions are both interactive parts of the visible web site and their communication should not be delayed by a client-server round-trip. In an alternative embodiment, hub 205 may be implemented on website building system server 20 in the cases where the third party application servers 40 need to exchange a lot of data and it is preferable better not to route them through client 10.

It will be appreciated that communication hub 205 may support different combinations of communication between website building system 30 and one or more third party applications 40 as well as between multiple third party applications 40. For example, hub 205 may enable third party application 40 to request website building system 30 to switch to another page in the main site. Communication hub 205 may also enable a third party application 40 to request to resize its own window possibly affecting the layout of the containing page. This may be done through dynamic layout handling described in more detail herein below. Alternatively, containing web page 203 may request (for example) that the third party application 40 switch to a different version if this is required to accommodate change in the display. It will be appreciated that this 2-way communication may also be initiated between a third party application 40 component and a website building system 30 component related to third party application 40 which displays additional information as well as communication between elements of multi-part third party applications 40 and modular third party applications as described here in above.

It will be further appreciated that system 100 may also be implemented using both an on-line and offline website building system 30, and that it may use any combination of hosting methods, such as client-side elements, website building system 30 vendor servers, third party application 40 vendor servers and other fourth party servers. It will be appreciated that for an offline embodiment as described herein above a server may still be required to implement system 100.

System 100 may also be hosted on a different server set (not operated by the website building system vendor) such as a private site hosting arrangement for a large organization.

System 100 may also support the full gamut of third party application 40 instances inclusion options from third party application 40 as discussed herein above. However, system 100 may also only support a subset of these options or may place a restriction on third party application 40 instance inclusion possibilities.

System 100 may also implement multi-part third party applications 40. A multi-part third party application 40 may include multiple displayed regions, each of which is handled using a separate iframe. These regions may also cooperate (as needed) through communication hub 205 as described in more detail herein below.

Figure 9:
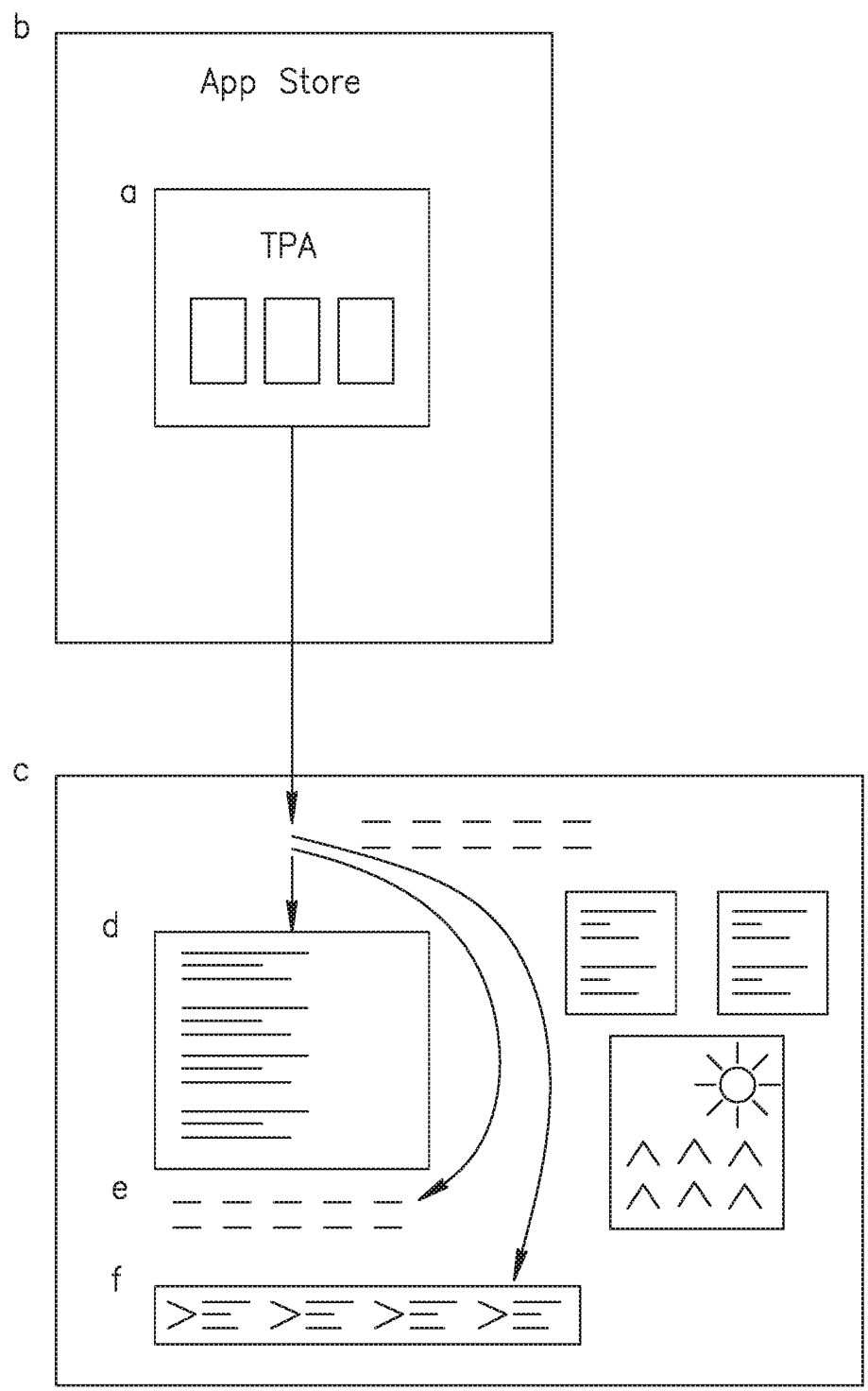
FIG. 9 is a schematic illustration of a sample multi-part blog third party application.

Reference is now made to FIG. 9 which illustrates an example of a multi-part third party application 40. As is shown, a blog third party application [a] acquired from AppStore [b] is placed in containing web page 203 [c]. The blog third party application [a] includes three regions as follows: a blog entry region [d]; a tag cloud region [e]; a news update region [f]. It will be appreciated that a multi-part third party application may use its multiple regions in a number of ways, including as multiple concurrently-resident parts of a single application—as in the blog example above or as multiple optionally-resident parts of a single application—with a number of regions which are always visible and a number of regions which are optional and are only displayed as required. The display of the optional regions may be controlled by third party application 40, or by designer 5 (who decides how to configure the third party application when including it). The display may also be controlled as support functionality regions, such as configuration or extra dialog regions; as an alternative display for a multi-version third party application (e.g. having a small and a large version of the third party application, or having a portrait and a landscape version of the third party application).

It will be appreciated that the above mentioned functionality may be implemented using iframes for third party application 40 element display, thus gaining the encapsulation and security advantages of iframe-based architecture.

It will be further that the implementation of multi-part third party applications 40 requires that third party applications 40 (inside their iframes) may control the display of the various iframes (e.g. their visibility, size and position). It will be further appreciated that communication hub 205 may enable this display as described in more detail herein below.

It will also be appreciated that even when a multi-part third party application 40 consists (visually) of multiple elements and regions, it is still regarded as a single third party application 40 in terms of purchasing (e.g. in AppStore 25), installation, configuration and so on.

In existing systems, each third party application 40 may be considered a separate entity and any cooperation between two third party applications 40 (from the same vendor or otherwise cooperating vendors) has to be developed ad-hoc, on a case by case basis. It will be appreciated that system 100 may also support modular third party applications 40 which consists of multiple cooperating sub-modules which can be purchased and installed separately.

Figure 10:
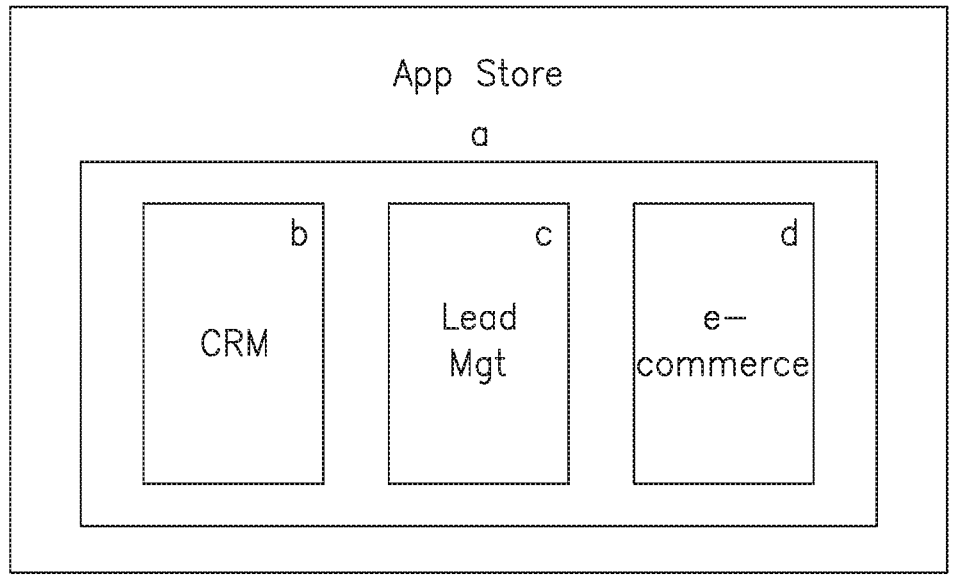
FIG. 10 is a schematic illustration of a sample modular sales third party application.

Reference is now made to FIG. 10 which illustrates how a modular sales management third party application [a] might include the following sub-modules: a CRM module [b]; a lead management module [c] and an e-commerce module [d]; The single third party application vendor may provide all required third party application modules. Alternatively, a third party application vendor may provide a subset of the third party application 40 modules (and functionality) and allow the designer to purchase/install complementary third party application modules from the same or additional third party application vendors. It will be appreciated that whereas a multi-part third party application is acquired and installed as a single third party application from a single vendor, which just happens to occupy multiple screen regions, a modular third party application includes multiple modules which may be acquired and installed separately, and may possible include modules from multiple third party application vendors. To provide the ability to integrate multiple third party application modules from multiple vendors, each third party application module must provide a list of the interfaces/functions it requires, and of the interfaces/functions it provides. This can be done, for example, by using lists of interface names based on hierarchical dot-separated name convention (e.g. My_CRM_T-PA.NewClient.GetInfo) and interface parameter specification.

A third party application 40 module may designate required interfaces as mandatory (i.e. the module will not work without them) or as optional (i.e. the module would work, but may provide reduced or modified functionality). Thus, the parameters provided for each interface are: Interface unique name; interface description—shown to designer 5 so he or she would know (for example) the functionality handled by the missing interfaces; mandatory/optional status; interface parameters list and types. It will be appreciated that each third party application module still resides in a separate iframe (or set of iframes). The operation of the interfaces is based on the communication channels described in more detail herein below.

It will be appreciated that the third party application 40 modules may be assembled during the website design stage. Website building system 30 may resolve the interface references as additional third party application 40 modules are added—with new third party application 40 modules resolving existing required interfaces but possibly adding new (unresolved) required interfaces.

It will also be appreciated that designer 5 may edit and run the complete web site while mandatory (and optional) interfaces are still unresolved. However, designer 5 may not publish the created web site until all mandatory interfaces are resolved, and will be prompted if attempting a function which may require hub 205 to activate a third party application module which still has unresolved mandatory interfaces.

It will be further appreciated that AppStore 25 may comprise a searcher 26 which may attempt to locate third party application modules that resolve required third party application module interfaces. Searcher 26 may search based on unresolved interfaces for a specific third party application module(s) or for all third party application modules. Searcher 26 may also search on currently unresolved interfaces or even on already resolved interfaces as well as search on mandatory, optional or both types of interfaces. It will be appreciated that searcher 26 may also be limited to resolving specific third party application unresolved interfaces and to searching for specific third party application vendors. Searcher 26 may either perform a first level search (i.e. modules satisfying currently unresolved interfaces) or a multi-level search (i.e. perform a repeated search, also looking for modules satisfying unresolved interfaces added when taking into account third party application modules found by the previous search round).

System 100 may use the interface descriptions to provide information to designer 5 on the significance of proceeding with some missing interfaces. Hub 205 may provide interface translation between non-compatible third party applications which still need to communicate. This can be done by an adapter module added by the website building system 30 provider or by an external party which adapts a given required interface to a different format.

System 100 may also be applied to on-line application editing systems, which use the Internet (or any other network connection) and use non-browser client-side software to view the created on-line application. Such a system does not need to use the specific technologies (e.g. IP communication, HTTP, HTML etc.) in use by the regular web infrastructure.

It will be appreciated that standard cross domain communication methods known in the art may be used to facilitate cross-domain communication. These methods may include:

HTML5 PostMessage. This is a standard HTML5 feature which can be used to provide safe cross-domain messaging. Using the HTML5 Windows.Postmessage, messages can be safely sent between windows, iframes and the main HTML document even when residing in different domains. PostMessage provides the tools for the sending iframe to specify the domain to which the message would be sent, and for the receiving iframe to verify the domain from which the message was sent.

URL Fragment Identifier for Messages: This method relies on using the URL fragment identifier to send message data from one end-point to another end-point. The data is encoded in plain text and added (as fragment identifier) to a URL which is used to call a service on the target end-point domain or a hidden iframe inside the target end-point iframe. The fragment identifier is then decoded by the code in the target service or iframe.

Specialized Communication Web Service Website building system 30 provides a specialized web hosted on the website building system server 20. Various communication end-points connect to this server—either to send a message or to check for waiting messages. This can be done via methods known in the art such as the pre-HTML5 Comet set of technologies, the HTML5-based WebSockets, or any other queuing, polling, server push or similar technique.

HTML5 Local Storage: HTML5 provides a structured local storage facility, which can be used to store queued messages. However, local storage can only be accessed by web content belonging to the same domain as the storing iframe. Solutions have been developed in the art, such as the underlying technique used by the Meebo XAuth product—now owned by Google Inc.—in which a small server provides the support for creating the required intermediate iframe which allows the domain-specific local storage to be accessed from iframes based in foreign domains.

HTML5 Local File System Access Application Programming Interfaces (APIs). Similar to the use of local storage described above, a cross-iframe communication channel may be constructed using local files on the local storage of the user agent accessed through the HTML5 file access API's (File API, FileWriter API and FileReader API). Note however that the sandboxed local file system created by HTML5 file system access API's is still origin-private, and thus an intermediate iframe/server component would be required to bridge the same-origin limitation.

Specialized Browser Plug In: A specialized browser (or other user agent) plug-in can be created to manage the cross-iframe message queue. Such a plug-in would have to be installed by users of website building system 30 (at all levels), and would provide the necessary services to all iframes and main website building system 30 pages.

It will be appreciated that communication hub 205 may act as a broker for all inter-iframe communication using any of the transport methods discussed herein above. It will be further appreciated that hub 205 may be fully aware of containing web page 203 structure and the third party application 40 details as provided by the third party application 40 vendor and stored in property sheet 23. Third party application 40 may also have different parameters when included in different applications and for different instances of inclusion within the same application (as described herein above). Such parameters may include a unique instance name which may be used for smart addressing (described in more detail herein below). It will also be appreciated that hub 205 may also be aware of additional third party application 40 details that may be not be stored in property sheet 23.

It will also be appreciated that hub 205 may also facilitate smart addressing and identification, verify communication origins, enforce communication policy, resolve third party application 40 non compatibility issues and also redirect from third party applications 40 to components. Hub 205 may also enable dynamic updates of layout in third party application 40 based on changes made to containing web page 203 as described in more detail herein below.

Figure 11A:
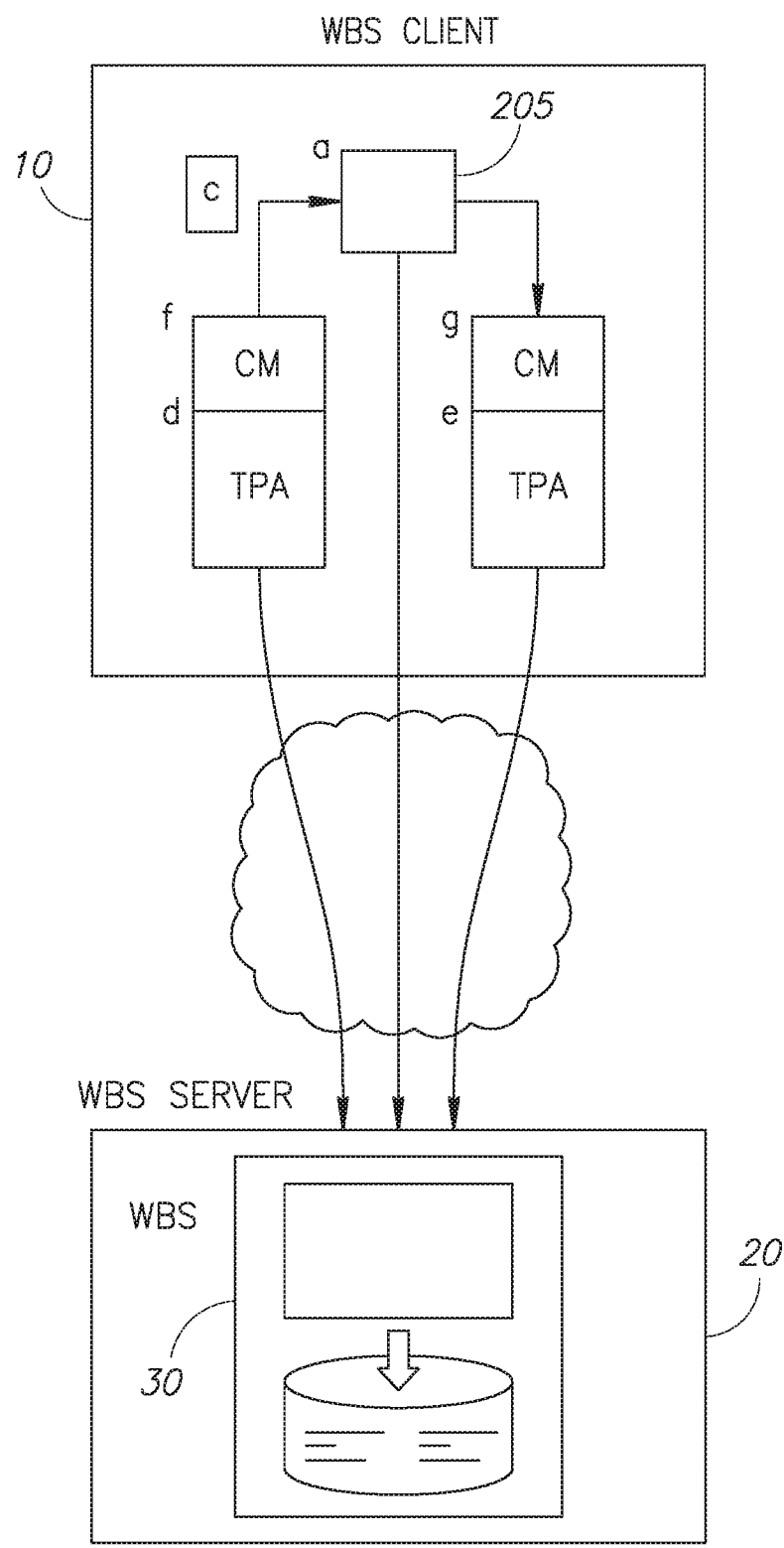
FIGS. 11A and 11B are schematic illustrations of different implementations of a communication hub, constructed and operative in accordance with the present invention.
Figure 11B:
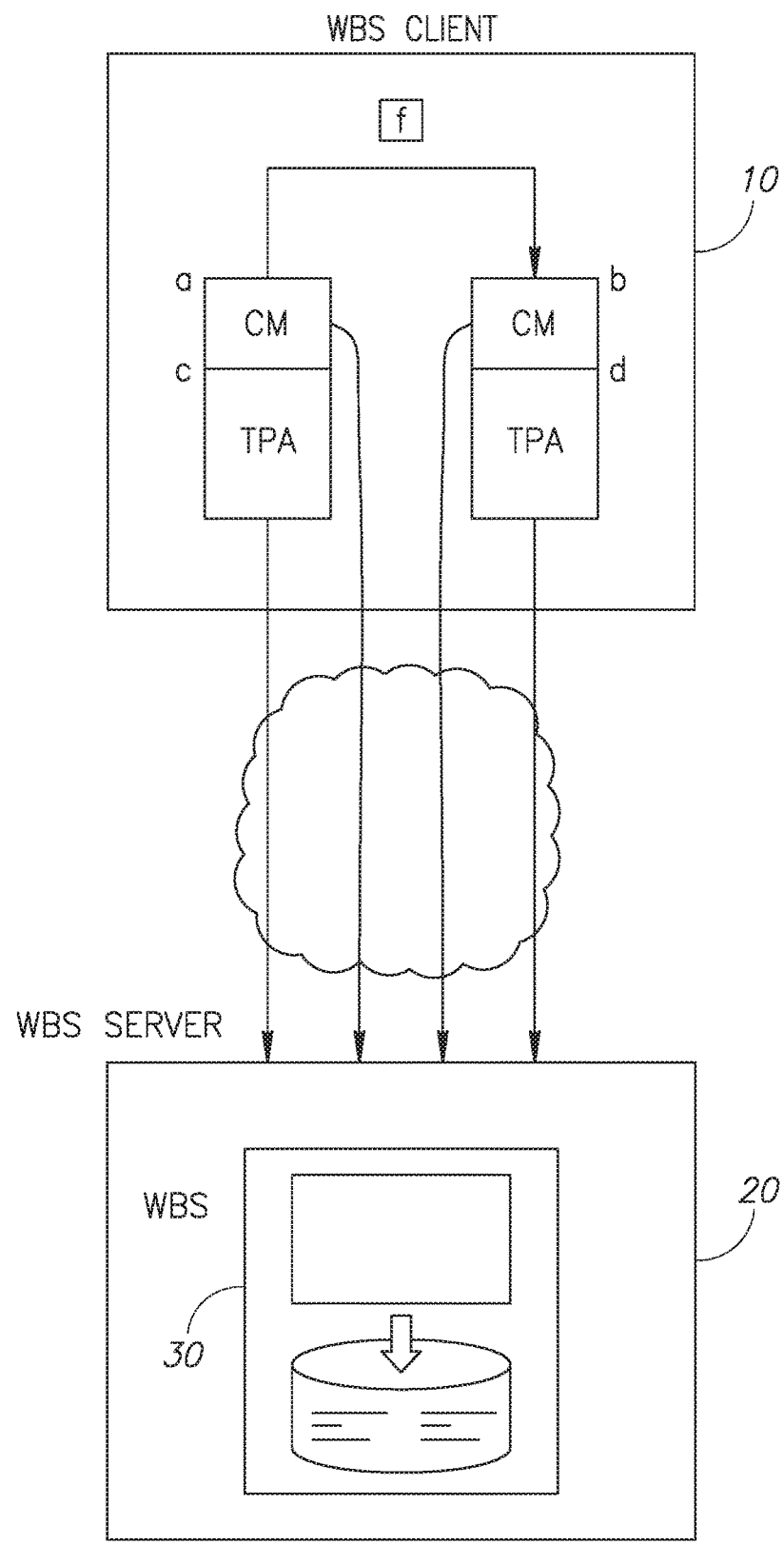
Figure 11C:
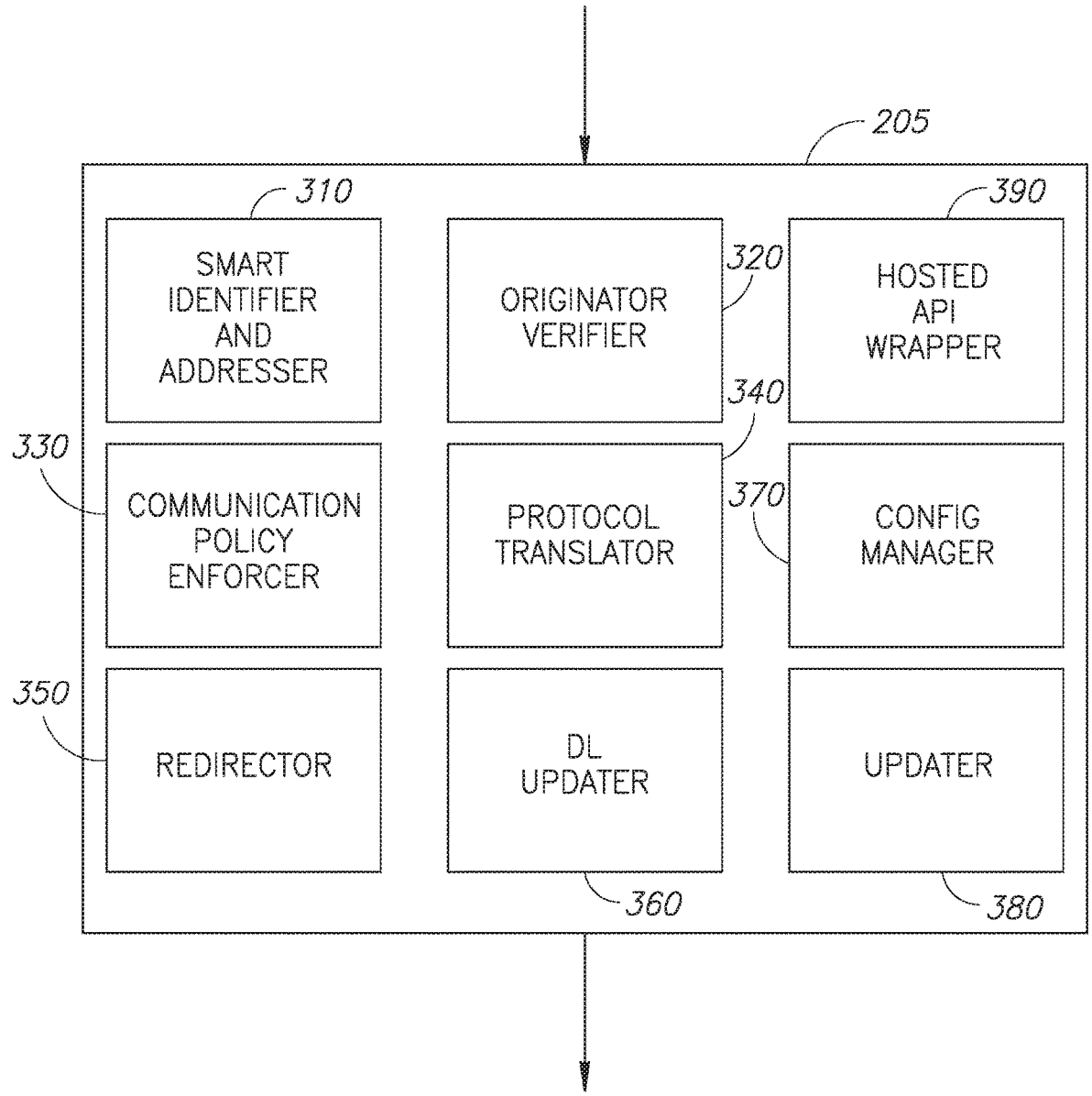
FIG. 11C is a schematic illustration of the elements of the communication hub of FIGS. 11A and 11B, constructed and operative in accordance with the present invention.

Reference is now made to FIGS. 11A and 11B which illustrate different implementation embodiments of hub 205 and FIG. 11C which illustrates the functionality of its different elements.

Hub 205 may comprise a smart identifier and addresser 310, an originator verifier 320, a communication policy enforcer 330, a protocol translator 340, a redirector 350, a dynamic layout updater 360, a configuration manager 370, a general updater 380 and a hosted application programming interface API wrapper 390. The functionality of these elements will be described in detail herein below. It will be appreciated that all the functionalities are applicable to all cross-domain communication channels, such as the third party application 40 to website building system 30 channel and third party application 40 to another third party application 40.

FIG. 11A to which reference is now made illustrates a typical embodiment for hub 205 through an intermediate iframe [a] which uses an internal communication application programming interface (API) to contact website building system 30. This way messages [c] sent (for example) from the TPA [d] to the TPA [e] (which use communication API modules [f] and [g] respectively) may be analyzed, verified or modified in ways which apply application-specific knowledge.

An alternative embodiment as is illustrated in FIG. 11B to which reference is now made does not use an intermediate iframe, but rather uses cross-domain communication in one or both of the communication API modules [a] and [b] (embedded into the third party applications [c] and [d] respectively). The modules [a] and [b] interact directly with website building system 30 to receive application-specific knowledge and use it when handling the communication message [f]. This embodiment has the disadvantage (compared to the embodiment shown in FIG. 11A) in that considerable amount of website building system 30 level information may be processed inside a module included in a third party application, and this information might be accessed (or even modified) by a malicious third party application.

As discussed herein above, in all the cross-communication methods described herein above, iframe addressing is based on the origin of the iframe (including source domain, protocol and port i.e. using direct third party application 40 addressing when sending a message (to specify the recipient) as well as when receiving a message (as the name of the sender provided to the recipient). In addition message sending requires the sender to specify the target iframe window (using JavaScript's documentgetElementById(" . . . ").contentWindow call or any other method). Thus, in existing systems, each third party application 40 must contain the full and specific details of any other third party application 40 with which it may communicate (including domain, protocol, port and iframe ID).

It will be appreciated that this type of direct addressing may be unwieldy in the environment of system 100. Even though designer 5 may integrate third party applications 40 from multiple non-coordinated third party application 40 vendors, third party application 40 vendors may supply third party applications 40 which are hosted in given domain, but are later moved to a different domain or sub-domain. A third party application 40 vendor may change the protocol or port used to contact any given third party application. Designer 5 may be required to modify the design of containing web page 203 containing third party application 40. All of these may occur in the third party applications 40 used in a web site which is operational and is being accessed by numerous users. In addition, a single containing web page 203 may include multiple instances of one third party application 40 which may serve different functions. For example, a single page in a product support web site might contain two chat third party application 40 instances—one for user-to-user chat and forum, and one used to converse with a vendors' support person when available.

It will be appreciated that smart identifier and addresser 310 may be fully aware of the structure of containing web page 203 and of the details of third party application 40 (as provided by the third party application 40 vendor to the website building system 30). Smart identifier and addresser 310 may provide addressing of source or target third party applications 40 to each other using any of the following: a third party application 40 unique name (as registered in AppStore 25); a third party application 40 instance descriptive ID added to each third party application 40 instance in containing web page 203 thus allowing the addressing of multiple instances of the same third party application 40; a generic identifier for a required third party application type/class (e.g. "I would like to send the message <x> to any event logging third party application 40 instance in containing web page 203"). Such an identifier may also describe the specific services which should be supported by the third party application 40. Smart identifier and addresser 310 may also use version indication for example: "I would like to send the transaction <x> to an instance of the accounting package <y> but only if it is of version <z>".

It will be appreciated that during runtime, third party applications 40 only communicate with hub 205, and therefore only need to know direct address of hub 205, and not of any other third party application 40. This one direct address may be encapsulated by a communication API wrapper (such as communication modules f and g as is illustrated in FIG. 11A and communication modules a and b as illustrated in FIG. 11B) provided by the website building system 30 to the third party application 40 provider. The calling third party application 40 may provide the application-aware third party application 40 descriptive addresses (as described above) and smart identifier and addresser 310 may translate them into direct third party application 40 addresses and perform the routing. This way, third party application 40 does not need to maintain a table of the absolute addresses of all possible third party applications 40 with which it communicates.

It will be appreciated that message originator verification is critical otherwise a receiving third party application 40 may receive a message from a hostile third party application 40. Since all communication may occur via hub 205, originator verifier 320 may check the authenticity of all incoming messages from third party applications. Originator verifier 320 may also provide additional information which may be added to the message and may be used for additional verification. It will be appreciated that since every third party application 40 included in AppStore 25 and used by system 100 is registered with website building system 30, hub 205 may verify with website building system 30 if a unique originator ID which may be included in the message, matches the message origin (domain, port, etc.).

Third party application 40 may define a general communication policy which may depend on external information, containing web page 203 information etc. Communication policy enforcer 330 may ensure that the communication policy in question is enforced without having to deal with non-conforming communication. For example, in a classified information handling web site, third party applications might be tagged with a classification level field in their profile. A third party application 40 providing a back-end event logging database which is certified to a classification level X may define a policy whereby it will not accept events for logging which have a classification level greater than X. Communication policy enforcer 330 may in such a situation, perform the required preliminary filtering, and prevent highly classified messages from even reaching the lower classification application.

Figure 12:
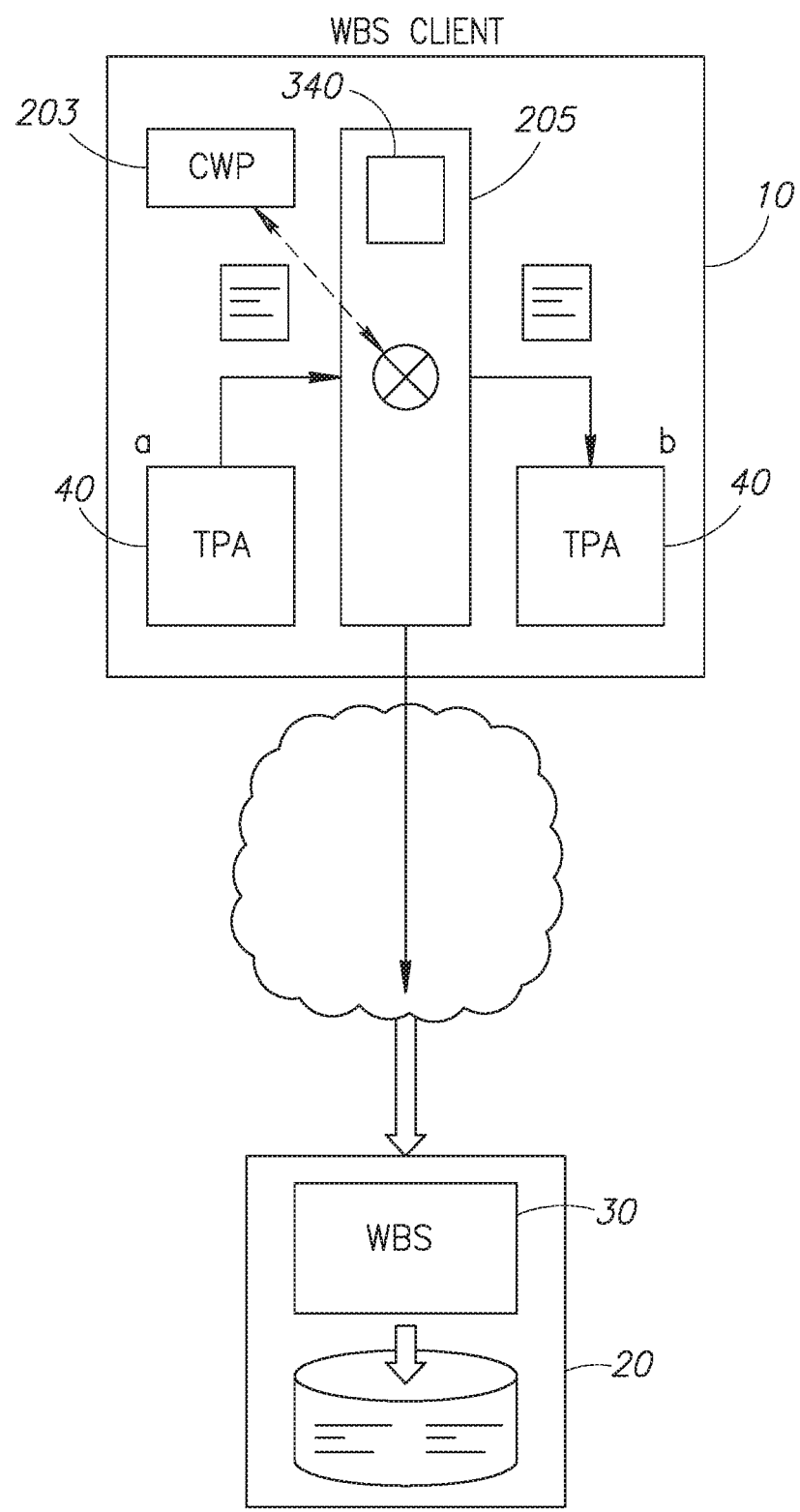
FIG. 12 is a schematic illustration of a communication translation scenario performed by the communication hub of FIGS. 11A and 11B, constructed and operative in accordance with the present invention.

It will be further appreciated that designer 5 may wish to include two (or more) third party applications in the same created web-site which could possibly cooperate, but do not actually do so due to some protocol compatibility issue. For example as is illustrated in FIG. 12 to which reference is now made, e-Shop third party application [a] may have the capability to post purchase order messages to a fulfillment and shipping third party application such as the third party application [b] (provided by a different vendor). However, the information provided by the third party application [a] may not include some fields required by the third party application [b]. Such situation should typically be resolved by the third party application vendors of the third party applications involved, but in some cases such resolution is not possible (e.g. one of the two third party applications is not currently updated for some reason). Protocol translator 340 may translate the relevant messages from [a] to [b] (e.g. by providing the additional required fields). Such translation may be performed by protocol translator 340, or may possibly involve some interaction with the embedding web site and containing web page 203 (e.g. if additional information is needed).

It will be further appreciated that third party application 40 may have some capabilities which require sending or receiving messages from another third party application 40 (such as the e-Shop/fulfillment third party application 40 pair described above). However, in some cases a part of the solution may be missing, in the above example, it may happen that no matching or appropriate fulfillment third party application 40 exists. In such a case, redirector 350 may allow designer 5 to specify that given messages may be routed to or from a containing web page 203 component and that the matching capabilities may be resolved by the containing web page 203 component and the functionality the components may provide. This may allow construction of the full web site without requiring the construction of a special-purpose third party application 40. Therefore transactions may be posted to a website building system 30 component which can perform logging of transactions to a database, and the database may be later used (by a separate program) to perform off-line fulfillment and shipping.

Third party applications 40 may provide multiple configurations, having different capabilities, using the same code base but with different enabled functionality. For example, a third party application 40 may provide basic functionality through a free version, and additional functionality through a purchased premium version, multiple paid versions or additional purchased third party application 40 features.

It will be appreciated that system 100 may include a website building system 30 based management of the per-user (or in fact per-designer) third party application 40 purchase status. It will be further appreciated that the designers may all be registered website building system 30 users and website building system 30 can thus manage a database of third party application 40 purchases for each designer 5. This information may be stored in property sheet 23 by TPA coordinator 24 during the design phase and by configuration manager 370 during runtime. For example, a third party application 40 may send a website building system 30 client-side element a version inquiry message. The website building system 30 client-side element may consult with repository 22 or with a locally cached copy thereof and return a response message to third party application 40 with the information about the capabilities it should provide.

In an alternative implementation, website building system 30 may provide third party application 40 with the required third party application 40 configuration information via an alternative channel, such as an encrypted iframe parameter, without requiring a previous inquiry message.

As discussed herein above, third party application 40 may communicate directly with specific containing web page 203 components. Third party application 40 may identify the components to communicate with in a number of ways: directly for components based on associated templates (described in more detail herein below); though an access ID explicitly provided by designer 5 to specific containing web page 203 components; by traversing a (possibly selective) component model provided by containing web page 203 to third party application 40.

It will be appreciated that during runtime, updater 380 may implement messages and responses between containing web page 203 components and third party application 40. For example third party application 40 may affect or query the visual and display attributes of containing web page 203 components (such as their position, size, color, transparency etc.). Updater 380 may also enable third party application 40 to read or write the content of containing web page 203 components and may also allow third party application 40 to direct components which perform media functions, e.g. post a given audio or video segment to a media player component, or require it to pause playing for a given period.

Updater 380 may also facilitate website building system 30 components to specify the type of access they allow third party applications 40 to have—similar to the way in which access permission bits or access control lists (ACL's) function for the protection of files in modern operating systems. Such permissions may be defined for each component so as to apply for all third party applications 40, from specific vendors or for specific third party applications 40. For example a third party application 40 may be allowed to access a text field which is part of containing web page 203 outside third party application 40. This text field may be used to edit a blog entry for a blog third party application 40, providing more screen real estate than that which can be provided inside the blog third party application 40 area itself. It will be appreciated that for third party applications 40 embedded into specific mini-pages inside a multi-page container, website building system 30 may limit the access of third party application 40 to components in the specific mini-page alone.

It will also be appreciated that updater 380 may also allow a third party application 40 to affect site-global elements. This may include getting and setting attributes such as the current page in the site, the current mini page in a container containing third party application 40 and the page history. Updater 380 may also filter or limit such requests.

Updater 380 may also enable website building system 30 to affect the style and display of third party application 40. Updater 380 may implement calls through which website building system 30 may provide formatting and style guidelines to the third party application 40. These may include properties such as: colors and color schemes; fonts; character sizes; transparency; animation and special effects (e.g. blurring). The color scheme, in particular, may include a generic color scheme (e.g. use the following x colors), or as high-level color (e.g. use the color x for text, color y for frames).

It will be appreciated that one preferred method to express complex style information is the use of Cascading Style Sheets (CSS), which can express a combination of multiple style directives, including fonts, sizes, colors etc. Updater 380 may send such CSS-based messages to third party application 40. The style sheets may be generic in nature, or include specific style names defined by the third party application 40, so that website building system 30 may provide better guidelines to third party application 40 (e.g. a style sheet may refer to specific third party application 40 elements and provide guidelines for them).

Third party application 40 may then use these guidelines to make its own look and feel and better adapted to containing web page 203. This is particularly important for third party applications 40 included or visible from multiple containing web pages 203 in the same site (multi-port inclusion as noted above). The multiple containing pages might employ different color scheme or general design. Third party application 40 may use the information provided to it through these style messages, and adapt its own display colors and style to better fit each containing page, and avoid displaying discordant color schemes or look and feel as compared to the containing page.

It will be appreciated that dynamic layout DL updater 360 may enable website building system 30/third party application 40 or third party application 40 and a secondary third party application cooperation in handling display changes resulting from a dynamic layout event. Website building system 30 may change the size and position of the components in a page in order to preserve the page design under events which change some of the components in the page. These dynamic layout events may include, for example: viewing the web site on screens having different sizes; rotating the display device between portrait and landscape mode; changing the size or position of some of the components and changing the content of given components (in a way which requires them to change their size). A dynamic layout event may also include a component update resulting from a server-based content update—e.g. in a component displaying information from a data feed, or due to content change by another concurrent user of the same web site. It will also be appreciated that dynamic layout events may occur in the design environment as well as the run-time environment. In particular some components and third party applications 40 may allow component content change or size/position change during run-time (i.e. by the end-users), and not just by the designers.

It will also be appreciated that a dynamic layout event might also be caused by third party application 40. For example, an e-Shop third party application 40 may require a size change when the user moves from a product catalog view to a shopping cart view (having a different size). As another example, a product catalog third party application 40 may include the option for product highlighting, which would cause them to display a larger catalog page including more content. A third example is a multi-region third party application 40 which may start or stop displaying additional regions.

Existing systems typically handle such situations (if at all) by clipping the third party application display, adding scroll bars to it or just resizing it as a pop-up window which hides other page components as illustrated in FIG. 6, back to which reference is now made. Dynamic layout updater 360 may implement cooperative dynamic layout in which website building system 30 and third party applications 40 cooperate in performing dynamic layout and retain the basic design of containing web page 203. The functionality of dynamic layout is further described in U.S. patent application Ser. No. 13/771,119 filed 20 Feb. 2013, issued as U.S. Pat. No. 10,185,703 on Jan. 22, 2019, and assigned to the common assignees of the present invention. However, even in a cooperative dynamic layout supporting system, the dynamic layout mechanism in containing web page 203 does not have full control of the internal layout of third party application 40. Furthermore, website building system 30 widgets may be designed so they can be resized to any arbitrary size (within a given range), but third party application 40 may not support arbitrary resizing. Third party application 40 may provide, for example, any combination of the following: a number of display configurations having different sizes (e.g. display more or less details); the ability to resize some of its internal elements and the ability to display some of its internal text elements using multiple font sizes.

Third party application 40 may still offer a limited number of possible display sizes, and may have the entire range of possible sizes. Therefore, a [containing web page 203 → third party application 40] resizing request may be resolved by third party application 40 switching to the nearest possible size, or by providing a list of possible third party application 40 sizes (and allowing website building system 30 to select the right one to use).

Dynamic layout updater 360 may implement [containing web page 203 → third party application 40] cooperative dynamic layout using the following sequence:

For example, third party application 40 embedded in containing web page 203 may need to be resized to a given desired size (e.g. X1*Y1 pixels). Dynamic layout updater 360 may send third party application 40 a message requesting that third party application 40 resize its content to the given desired size (X1*Y1). Third party application 40 may adjust to that size—by using alternative display configuration, internal resizing, internal dynamic layout processing or any other means. It will be further appreciated that containing web page 203 may resize the external iframe window containing third party application 40 to the new size (X1*Y1).

It will be also appreciated that third party application 40 may only allow re-sizing to a limited set of possible sizes only (e.g. specific user interface configurations). Thus, dynamic layout updater 360 may use the following alternative algorithm which allows the third party application 40 to provide a set of possible sizes.

Containing web page 203 is resized and dynamic layout updater 360 sends third party application 40 a message requesting third party application 40 to resize its content to the given desired size (X1*Y1). Third party application 40 may then determine the nearest possible size (e.g. X2*Y2 pixels) and resize accordingly by using alternative display configuration, internal resizing, internal dynamic layout processing or any other means. Updater 380 may then send containing web page 203 a response message confirming the resizing and provide the actual new size (X2*Y2). Containing web page 203 may resize the external iframe window containing third party application 40 to the actual new size (X2*Y2). Containing web page 203 may continue the dynamic layout processing, based on the actual new size (X2*Y2).

It will be appreciated that another embodiment is also applicable, in particular if there are multiple third party applications 40 in containing web page 203 (or multi-region multiple third party applications 40). In this embodiment containing web page 203 may query the embedded third party applications 40 to get the list of display sizes so that they may attempt to optimize the look and feel taking into account the multiple options for the multiple third party applications 40. This embodiment may also be relevant in the case of third party applications 40 displayed over multiple regions.

Containing web page 203 may perform dynamic layout processing, discovering that one or more third party applications 40 (TPA[1] to TPA[n]) are embedded in containing web page 203 and should be resized using the following algorithm:

Loop on i from 1 to n:
For each TPA[i] determine
The minimal size Xmin[i] *Ymin[i];
The maximal size Xmax[i] *Ymax[i];
The optimal size Xopt [i] *Yopt [i];
Dynamic layout updater 360 may send a message to TPA[i], detailing the min/max/opt sizes above, and request information about possible third party application 40 sizes.

Third party application 40 may provide to dynamic updater 380 a set of possible size options which it may assume, Xposs[i][j] *Yposs[i][j].

Based on the Xposs[ ][ ]/Yposs[ ][ ] information collected above, containing web page 203 may calculate a solution for the dynamic layout calculation by using (for example) a full evaluation of all possible third party application size combination, linear programming techniques or any other technique used by the dynamic layout algorithm.

Store the results in Xfinal[i]/Yfinal[i] for all TPAs
Loop on i from 1 to n:
Containing web page 203 may then send a resize message to TPA[i] with Xfinal [i]/Yfinal [i];
Containing web page 203 resizes the external iframe window containing TPA[i] to Xfinal [i]/Yfinal [i];
Containing web page 203 continues the dynamic layout processing, based on the actual new sizes.

It will be appreciated that dynamic layout processing may typically require moving the third party applications 40 and not just resizing them. However, a third party application 40 should be invariant to the exact location of its frame inside containing web page 203.

As discussed herein above, third party application 40 may also need to change its display window size from time to time. Since the size of the window displaying an iframe is managed by the hosting page (i.e. containing web page 203), the third party application 40 window size change has to be performed by containing web page 203—with third party application 40 requesting (via dynamic layout updater 360) from containing web page 203 to change the window size.

It will also be appreciated that third party application 40 may also request (via dynamic layout updater 360) to change its position inside containing web page 203. This may not affect third party application 40 internally (as a size change does), but does require display changes in containing web page 203. Dynamic layout updater 360 may integrate this request with the dynamic layout. Containing web page 203 may activate dynamic layout updater 360 to change the third party application 40 window size (and possibly its location) and confirm the size and position change back to third party application 40.

It will be appreciated that hub 205 may also implement additional third party application 40 class-specific or third party application specific messages through which website building system 30 itself, a specific containing web page 203 or a secondary third party application 40 may affect third party application 40. For example, a blog third party application 40 may define an incoming message which may post a new blog entry, or a new talk-back to the current blog entry. Such a message may be used by containing web page 203 (e.g. as a way to post blog entries from a large editing field outside of the third party application area). It could also be used for higher-level application-to-application link, e.g. allowing a support third party application to post blog entries to a blog third party application.

It will be appreciated that third party applications 40 often require a wide variety of complex services—either for third party application 40 internal use or for downstream use by designers using third party application 40 in their sites. Such services may include user management, billing and shipping management. The web site building system 30 vendor may not be able to provide such services as part of the website building system (e.g. due to technical or business considerations). Furthermore, these services may be unsuitable for "packaging" as third party applications 40 by themselves. In addition, a third party application 40 vendor may need the option to provide multiple such services for a designer using the third party application 40 (e.g. multiple $3^{rd}$ party billing API's)—and allow designer 5 to select the right one for his or her use.

For example, a Paypal™ hosted API may be offered in website building system 30 and may be used directly by third party application 40 or may be offered by third party application 40 to the designers 5 using it. Third party application 40 may also offer its own set of options (i.e. use specific billing type, such as one-time, recurring or revenue sharing), and implement these options by calling the hosted Paypal API.

Thus, designer 5 using website building system 30 may develop a specific offering (such as a song-selling e-Store) which uses advanced billing. Designer 5 may avoid having to negotiate a specific clearing or merchant agreement with the billing API provider by using the hosted billing API—either directly or through a third party application 40 offering an additional abstraction level (or layer). In this sense, website building system 30 may become a distributor for the hosted API vendors.

Hosted API wrapper 390 may facilitate this communication between the different parts of the system (e.g. website building system 30, the hosted API code and the included third party applications 40) It will be appreciated that the API wrapper layer, and the actual API implementation may reside within website building system 30 itself or another third party application 40. The third party application 40 vendor (or designer 5) may use an hosted API through hosted API wrapper 390 without being aware of the way in which the actual underlying API is implemented.

In an alternative and complementary embodiment to the present invention, Applicants have also realized that smart integration between website building system 30 and one or more third party applications 40 may also be achieved by using an integration model in which additional website building system templates and components are associated with the third party applications at the level of the AppStore 25 as well as with the relevant third party application instances. Third party application 40 may also communicate with these components (as well as with non-associated components) to exchange data and control messages. As discussed herein above, third party application regions 40 within a containing web page 203 are separate iframes whose content is hosted in separate domains (third party application vendors' or otherwise)—different from the domain on which the main site is hosted. Thus, communication between the different iframes is subject to browsers' "same origin policy" and requires the use of techniques as described herein above.

Existing systems implement third party applications 40 as monolithic, rigid objects which are included in containing web page 203 but do not otherwise affect the look and feel of containing web page 203 itself. The third party 40 instance is placed in a (typically rectangular) area, and performs all of its activities within this area.

Applicants have also realized that this notion may be expanded by having an (optional) additional website building system 30 template associated with third party application 40, referred to as an associated template in accordance with an embodiment of the present invention. It will be appreciated that this association may be performed during the development and publishing of third party application 40 and may be presented to designer 5 as part of the third party application 40 selection/purchase process (from AppStore 25) and third party application 40 instance creation. TPA coordinator 24 may retrieve the template associated with the third party application 40 (as part of the application repository managed by the AppStore 25 or otherwise provided by the third party application 40 vendor) and may store the template in repository 22 for later use as described herein above.

It will be appreciated that system 100 may support the publishing of third party applications 40 with multiple associated templates—allowing designer 5 to select a template which best suits his or her needs.

It will be appreciated that when creating an instance of the third party application 40 in any containing web page 203, the components in the associated template may be merged with containing web page 203 and may be displayed together with any other components in containing web page 203.

Figure 13:
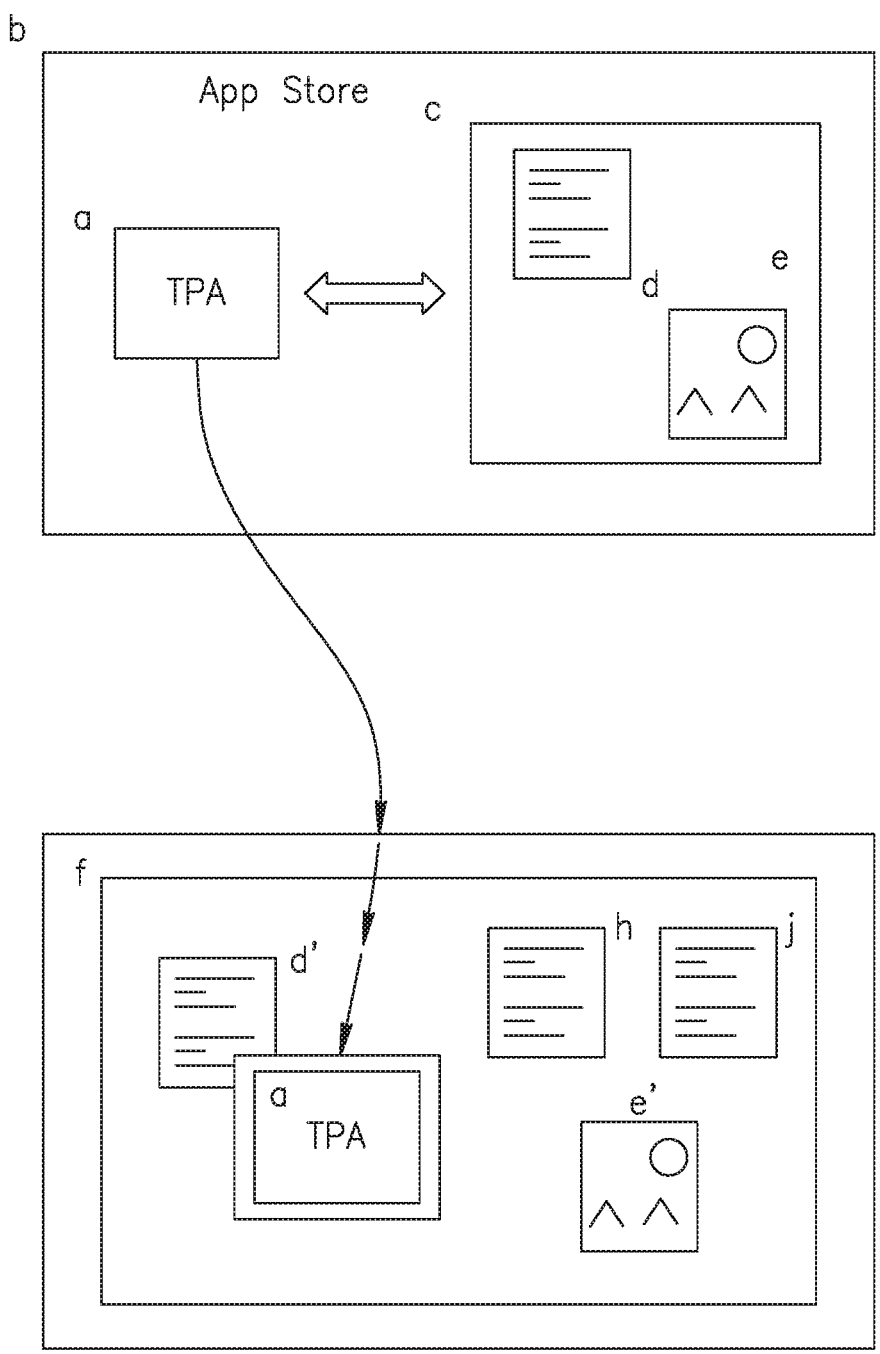
FIG. 13 is a schematic illustration of a containing web page handling a third party application which has an associated template, constructed and operative in accordance with the present invention.

Reference is now made to FIG. 13 which illustrates an example of the use of an associated template according to an embodiment of the present invention. As is shown, third party application [a] is placed in AppStore [b] together with associated template [c] that includes components [d] and [e]. It will be appreciated that when third party application [a] is included in containing web page 203 [f], third party application [a] may be displayed in its designated area [g] inside page [f] and instances [d'] and [e'] of the components [d] and [e] may be displayed on the page [f] together with the pre-existing components [h] and [j].

It will be appreciated that system 100 may support multiple ways in which the associated template component instances (e.g. [d'] and [e'] above) are positioned in the containing web page 203 [f]. These may include: absolute placement (i.e. using the size and position specified in the associated template [c] for the original [d] and [e]); target-relative placement (i.e. adjusting the size and position of the new instances [d'] and [e'] according to the containing web page 203 [f]); and third party application 40 relative placement (i.e. adjusting the size and position of the new instances [d'] and [e'] relative to the size and position specified for the third party application instance [g] inside containing web page 203 [f]). Determination of the specific placement method may be done based on settings included with the associated template [c], possibly allowing designer 5 to override it.

It will be further appreciated that designer 5 may modify the instances in [f] of the components [d] and [e] inherited from the template [c]. The changes may only apply to the use of [d] and [e] within [f] (and possibly pages inheriting from within website building system 30 which support inter-page inheritance), but may not affect the "original" template [c] associated with third party application [a] in AppStore [b].

Figure 14:
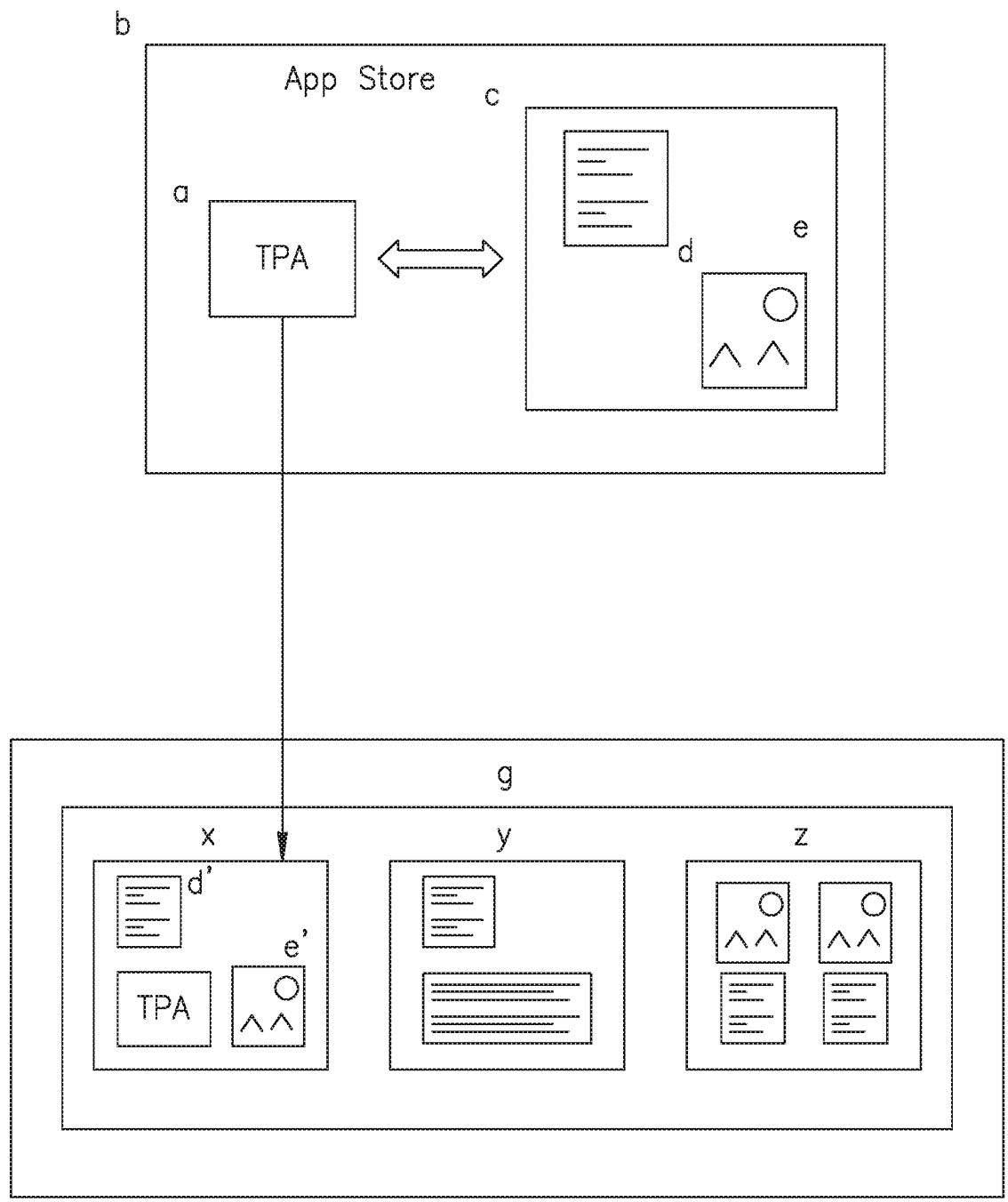
FIG. 14 is a schematic illustration of a containing web page that includes a third party application which has an associated template inside a mini-page, constructed and operative in accordance with the present invention.

It will be appreciated that the changes to the [d] and [e] instances above may include, in particular, assigning specific content (text, images, etc.) to the field instances—as well as regular attribute changes. It will be further appreciated that if third party application 40 is included inside a mini-page, the associated template is applied to the specific mini-page in which third party application 40 is included as is illustrated in FIG. 14 to which reference is now made. As is shown, third party application 40 is included in mini-page [x], and thus the components [d] and [e] are added to [x] but not to the additional mini-pages [y] and [z] of the same multi-page container [g].

It will be further appreciated that for section-type mini-pages, the associated template (if any) is applied to the virtual (and empty) containing web page 203 created to contain the third party application 40.

In an alternative embodiment, the pre-created associated template may be applied to a newly created page or mini-page, which is "parallel" to the including containing web page 203. This newly created page or mini-page may be initialized with the template, which could then be modified as desired.

Website building system 30 may also allow multi-port inclusion—in which the same third party application 40 instance is visible from and "resides in" multiple pages of the main site. This is different from multiple inclusion of a given third party application 40 in the main site—which creates multiple instances of the third party application 40. The third party application 40 content—which is instance-specific—is thus shared between the multiple views of the same multi-port third party application 40.

In such multi-port inclusion, the associated template may be applied separately to each of the pages and mini-page to which the third party application 40 instance is added.

As discussed herein above, system 100 may provide a 2-way communication link between third party application 40 and the components in containing web page 203. It will be appreciated that this includes containing web page 203 components resulting from the merging of the associated template from third party application, as well as components which are unrelated to any such associated template.

Thus it will be appreciated that a third party application 40 vendor may typically create a number of templates to be associated with the third party applications 40 produced by the vendor. These templates may include test, development and other templates in addition to the templates which are actually being distributed (i.e. associated with currently distributed third party application versions).

As discussed herein above, third party application 40 may be distributed through AppStore 25, and may also be distributed through alternative channels not related to or managed by the website building system 30 vendor. However, the associated templates distributed with third party application 40 may be highly related to and coupled with application repository 22, as they are built using components, base templates and other elements managed by website building system 30.

Furthermore, website building system 30 elements underlying such a separately-distributed associated template may have to be modified or deleted—possibly "breaking" the associated template. To resolve this problem, system 100 may implement these associated templates in a separate area (possibly per-third party application 40 vendor) inside application repository 22. Website building system 30 may manage these templates in the same way as other website building system 30 templates.

It will also be appreciated that the third party application 40 vendor may be provided with a unique ID (the development ID) for each template created, and may use this ID during third party application 40 development and testing process. Once third party application 40 is to be published/distributed, the third party application 40 vendor may be required to apply for and receive an alternate unique ID (the publishing ID), and may reference it in the published third party application 40. Once a publishing ID is provided, a separate locked copy of the template is created. This is the copy referenced by third party application 40 and used when creating instances of the third party application 40. In this way, the third party application 40 vendor is unable to mistakenly modify a template associated with a "live" third party application 40 (which is being included by designers) and referential integrity is preserved. Furthermore, system 100 may cross-reference the relationship between such locked templates and the underlying components and base templates. This cross-reference can be used, for example, to provide a warning to website building system 30 staff if a website building system 30 component or a base template included in such a locked template is to be modified (and such modification may break the template or the third party application 40 in some way).

Therefore system 100 may provide bi-directional communication channels between third party applications 40, the components in containing web page 203 and website building system 30. Containing web page 203 components may be based on a template(s) associated with the third party application, based other website building system 30 templates, or be unrelated to any template.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description above. In addition, embodiments of the present invention are not described with reference to any particular programming language. It will be appreciated that a variety of programming languages may be used to implement the teachings of the invention as described herein.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A device for a website building system (WBS), the device comprising:
   at least one processor; and
   a unit running on said at least one processor, said unit comprising:
      a third party application receiver to receive at least one editable WBS template associated with a third party application from a third party vendor, said receiver also to create a publishing ID for said at least one editable WBS template and separate copy of said at least one editable WBS template according to said publishing ID, said separate copy locked for editing by said third party application vendor;
      an installer to install said at least one editable WBS template into a website page when an instance of said third party application is created within said page; and
      wherein said receiver prevents said editing by said third party application vendor when said website page is live and accordingly preserves referential integrity for said at least one editable WBS template between said third party application and said website page; and
      wherein said receiver also performs interface resolution between said third party application and said page.

2. The device according to claim 1 wherein said device is implementable on at least one of a server and client.

3. The device according to claim 1 wherein said at least one editable WBS template contains at least one of: a said website building system component and a multipart third party application.

4. The device according to claim 1 wherein said website page is at least one of an existing page, an existing mini-page, a newly created page and a newly created mini-page.

5. A method for a website building system (WBS), the method comprising:
   receiving at least one editable WBS template associated with a third party application from a third party vendor, said receiving also to create a publishing ID for said at least one editable WBS template and separate copy of said at least one editable WBS template locked for editing by said third party application vendor;
   installing said at least one editable WBS template into a website page when an instance of said third party application is created within said page; and
   wherein said receiving prevents said editing by said third party application vendor when said website page is live, and and accordingly preserves referential integrity for said at least one editable WBS template between said third party application and said website page;
   and wherein said receiving also performs interface resolution between said third party application and said page.

6. The method according to claim 5 wherein said at least one editable WBS template contains at least one of: a said website building system component and a multipart third party application.

7. The method according to claim 5 wherein said website page is at least one of an existing page, an existing mini-page, a newly created page and a newly created mini-page.

* * * * *